(12) United States Patent
Abdelghaffar et al.

(10) Patent No.: US 12,219,571 B2
(45) Date of Patent: Feb. 4, 2025

(54) TRP DORMANCY CONFIGURATION IN A MULTI-TRP NETWORK

(71) Applicant: QUALCOMM Incorporated, San Diego, CA (US)

(72) Inventors: Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/652,668

(22) Filed: Feb. 25, 2022

(65) Prior Publication Data

US 2023/0276450 A1    Aug. 31, 2023

(51) Int. Cl.
*H04W 72/23* (2023.01)
*H04L 5/00* (2006.01)
*H04W 72/21* (2023.01)

(52) U.S. Cl.
CPC ........... *H04W 72/23* (2023.01); *H04L 5/0048* (2013.01); *H04W 72/21* (2023.01)

(58) Field of Classification Search
CPC .................................................... H04W 72/23
See application file for complete search history.

(56) References Cited

U.S. PATENT DOCUMENTS

| | | | | |
|---|---|---|---|---|
| 2023/0103436 A1* | 4/2023 | Lin | ...................... | H04B 7/0695 370/329 |
| 2023/0318686 A1* | 10/2023 | Kwak | .................... | H04B 7/088 455/101 |
| 2023/0421340 A1* | 12/2023 | Tidestav | ............... | H04W 72/04 |
| 2024/0008052 A1* | 1/2024 | Matsumura | ........ | H04B 7/06964 |
| 2024/0023045 A1* | 1/2024 | Da Silva | ............. | H04W 36/249 |

OTHER PUBLICATIONS

International Search Report and Written Opinion—PCT/US2023/011554—ISA/EPO—May 15, 2023.
OPPO: "Discussion on Inter Cell Beam Management", 3GPP TSG RAN2 Meeting #115, R2-2107257, 3rd Generation Partnership Project, Mobile Competence Centre, 650, Route Des Lucioles, F-06921 Sophia-Antipolis Cedex, France, vol. RAN WG2, No. Electronic Meeting, Aug. 1, 2021 Aug. 6, 2021, XP052033996, 5 Pages, Section 2.2.

(Continued)

*Primary Examiner* — Jason E Mattis
(74) *Attorney, Agent, or Firm* — Procopio, Cory, Hargreaves & Savitch LLP

(57) ABSTRACT

A UE may receive a configuration of multiple TCI states including a TCI state for each of multiple TRPs. The UE may also receive an indication of dormancy for one or more TRP of the multiple TRPs. The UE may further transmit or receive communication based on a default TCI state, the default TCI based at least in part on the dormancy of the TRP. The UE may communicate with a network entity that configures multiple TCI states for the UE. The multiple TCI states may include a TCI state for each of multiple TRPs. The network entity may output for transmission an indication of dormancy for one or more TRP of the multiple TRPs. The network entity may further output or obtain communication based on a default TCI state, the default TCI based at least in part on the dormancy of the TRP.

30 Claims, 16 Drawing Sheets

(56) References Cited

OTHER PUBLICATIONS

OPPO: "Enhancements on HST-SFN Deployment", 3GPP TSG RAN WG1 #106bis-e, R1-2109042, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021 Oct. 1, 2021, XP052058003, 7 Pages, Sections 1, 2.2, 2.3.

* cited by examiner

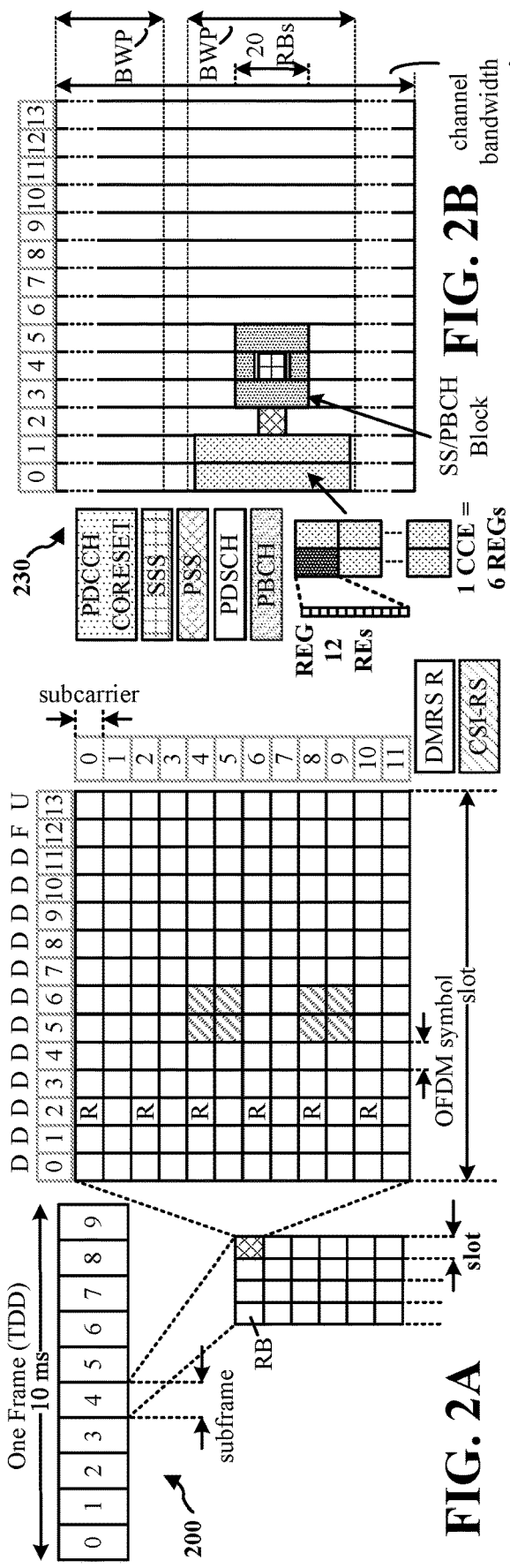
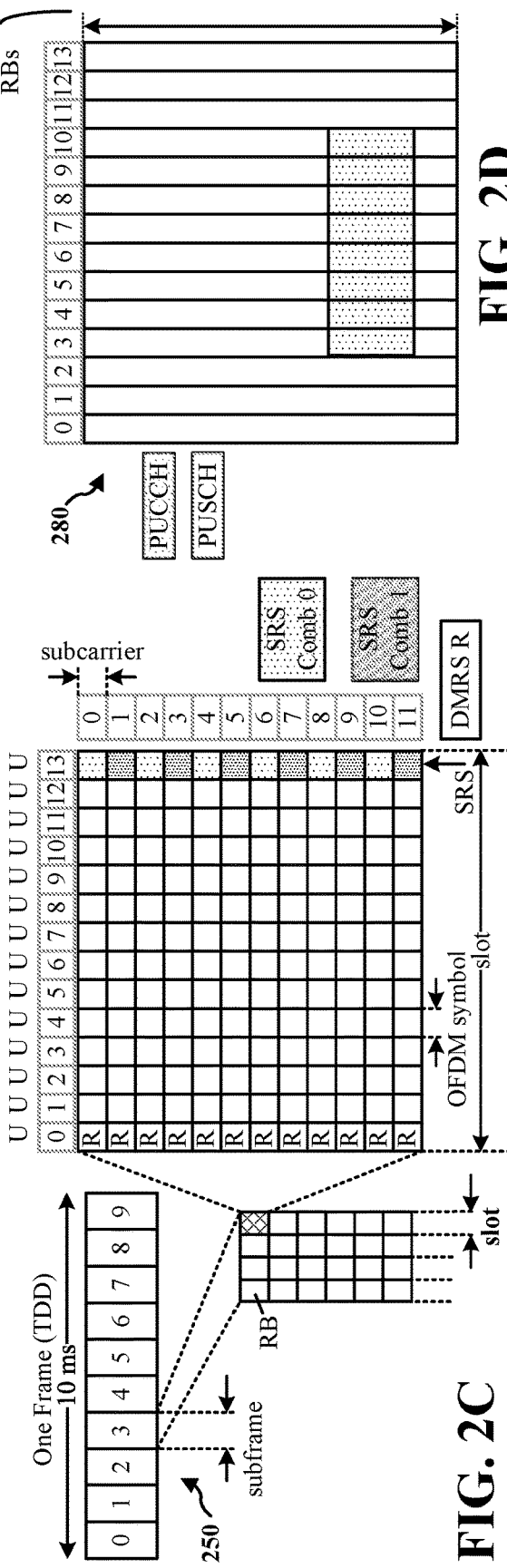
FIG. 2A
FIG. 2B
FIG. 2C
FIG. 2D

TRP DORMANCY CONFIGURATION IN A MULTI-TRP NETWORK

TECHNICAL FIELD

The present disclosure relates generally to communication systems, and more particularly, to a transmit reception point (TRP) dormancy indication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Maintaining a network, such as cellular network, can be a costly endeavor. While a system may put network devices to sleep in a dormant state to save power, putting such devices to sleep may reduce the functionality of the system. For example, a user equipment (UE) may be unable to transmit or receive data with a network device that is in a dormant state. A UE in such a network may be configured to dynamically adjust their communication protocols to accommodate dormant devices.

In an aspect of the disclosure, a method, a computer-readable medium, and an apparatus for wireless communication at a UE are provided. The apparatus may have a memory and at least one processor coupled to the memory and configured to receive a configuration of multiple transmission configuration indication (TCI) states including a TCI state for each of multiple transmission reception points (TRPs). The processor may be further configured to receive an indication of dormancy for one or more TRP of the multiple TRPs. The processor may be further configured to transmit or receive communication based on a default TCI state, the default TO based at least in part on the dormancy of the TRP.

In an aspect of the disclosure, a method, a computer-readable medium, and an apparatus for wireless communication at a network entity are provided. The apparatus may have a memory and at least one processor coupled to the memory and configured to configure multiple TCI states, the multiple TCI states including a TCI state for each of multiple TRPs. The processor may be further configured to output for transmission an indication of dormancy for one or more TRP of the multiple TRPs. The processor may be further configured to output or obtain communication based on a default TCI state, the default TCI based at least in part on the dormancy of the TRP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
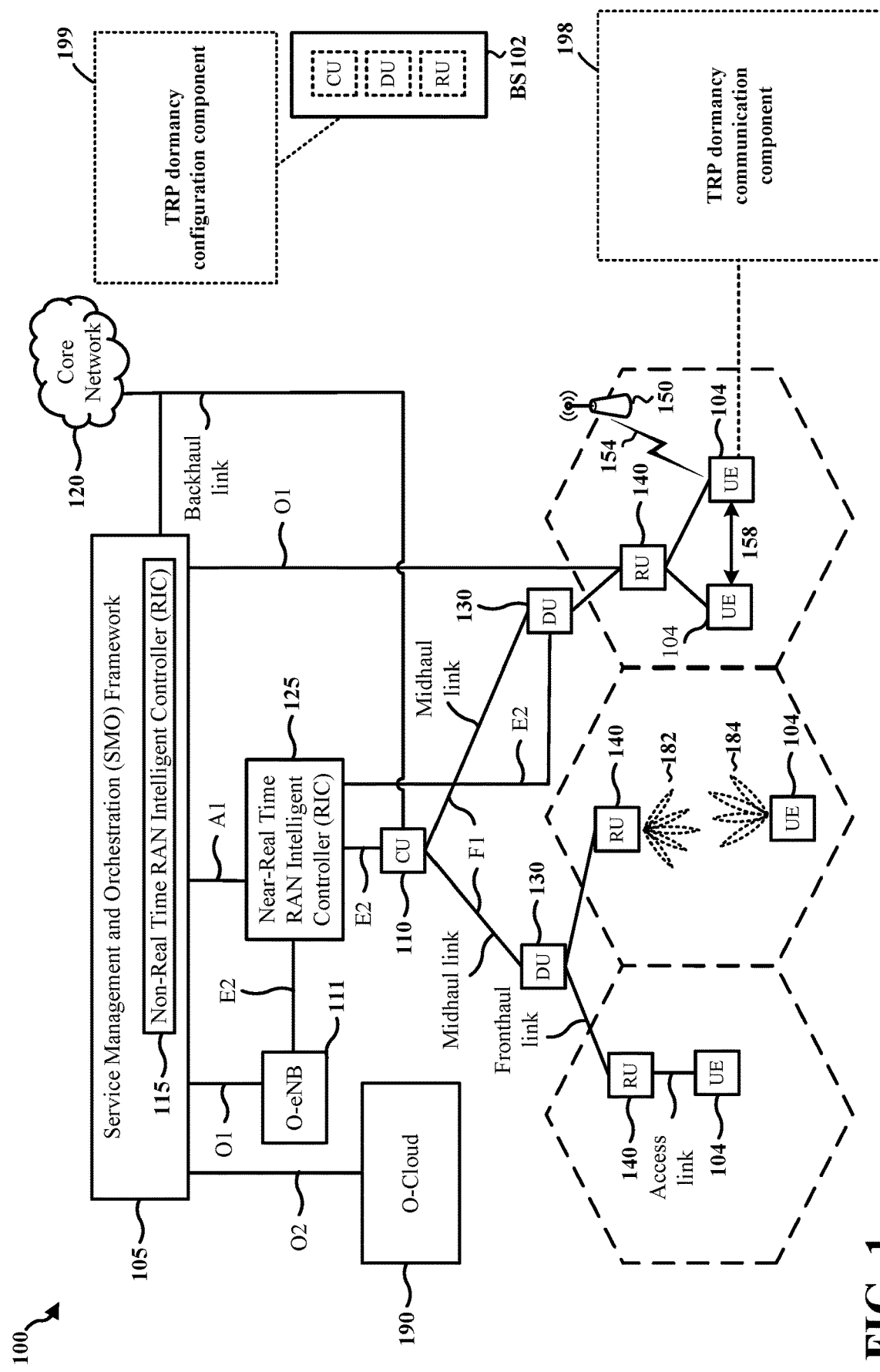
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB 111 (O-eNB), via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (Pcell) and a secondary component carrier may be referred to as a secondary cell (Scell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to dynamically adjust what TRPs the UE 104 communicates with using a TRP dormancy communication component 198. In certain aspects, the base station 102 may be configured to TRP configuration information to a UE 104 using a TRP dormancy configuration component 199. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
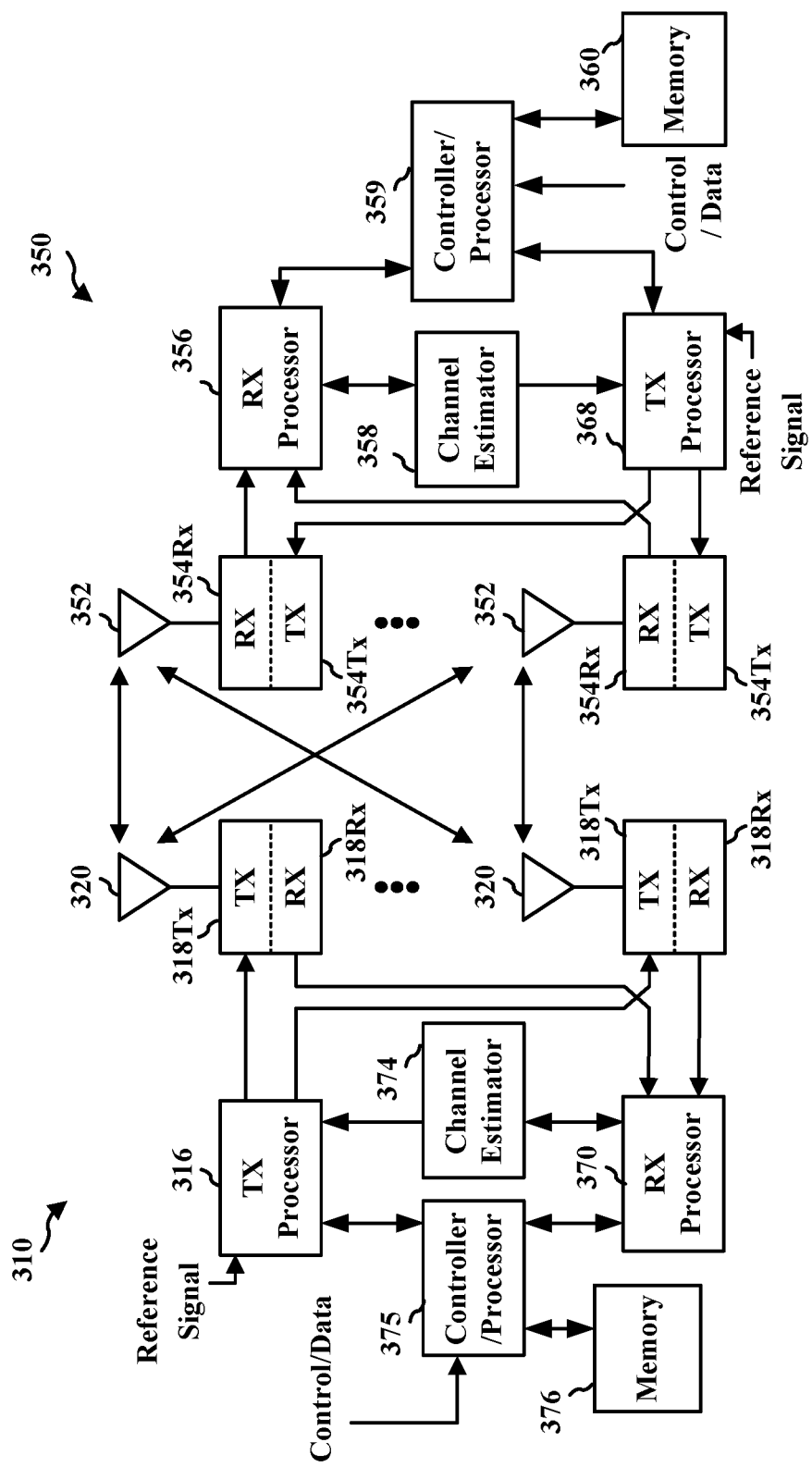
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to an Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with TRP dormancy communication component 198 in FIG. 1.

At least one of the Tx processor 316, the Rx processor 370, and the controller/processor 375 may be configured to perform aspects in connection with TRP dormancy configuration component 199 in FIG. 1.

A network, such as the wireless communications system discussed in diagram 100 in FIG. 1, may require energy resources to provide wireless communication. For example, network energy consumption may consume as much as 23% of a network operator's costs. In some aspects, a network's RAN may use most of the energy required to keep a network running. For example, as much as 50% of a network's energy consumption may be used to maintain a 5G network. 5G massive MIMO active antenna units (AAUs) may consume additional power. Improved network energy savings may allow for greater adoption and expansion of network technology, such as cellular networks.

A network may employ various aspects that help to reduce energy, such as having configurable broadcast signals, such as SSB and SIB1, on-demand system information (SI) for other SIB s, or cell-level activation and deactivation rather than having a periodic reference signal. In other aspects, the network may apply intra-system load balancing, on demand PRS, minimization of drive test (MDT)/self-organizing network (SON), inter-RAT and inter-system cell activation/deactivation, mobility load balancing, capacity and coverage optimization to assist in energy reduction. In some aspects, a network may employ artificial intelligence (AI) or machine learning (ML) to assist in network power savings.

Figure 4:
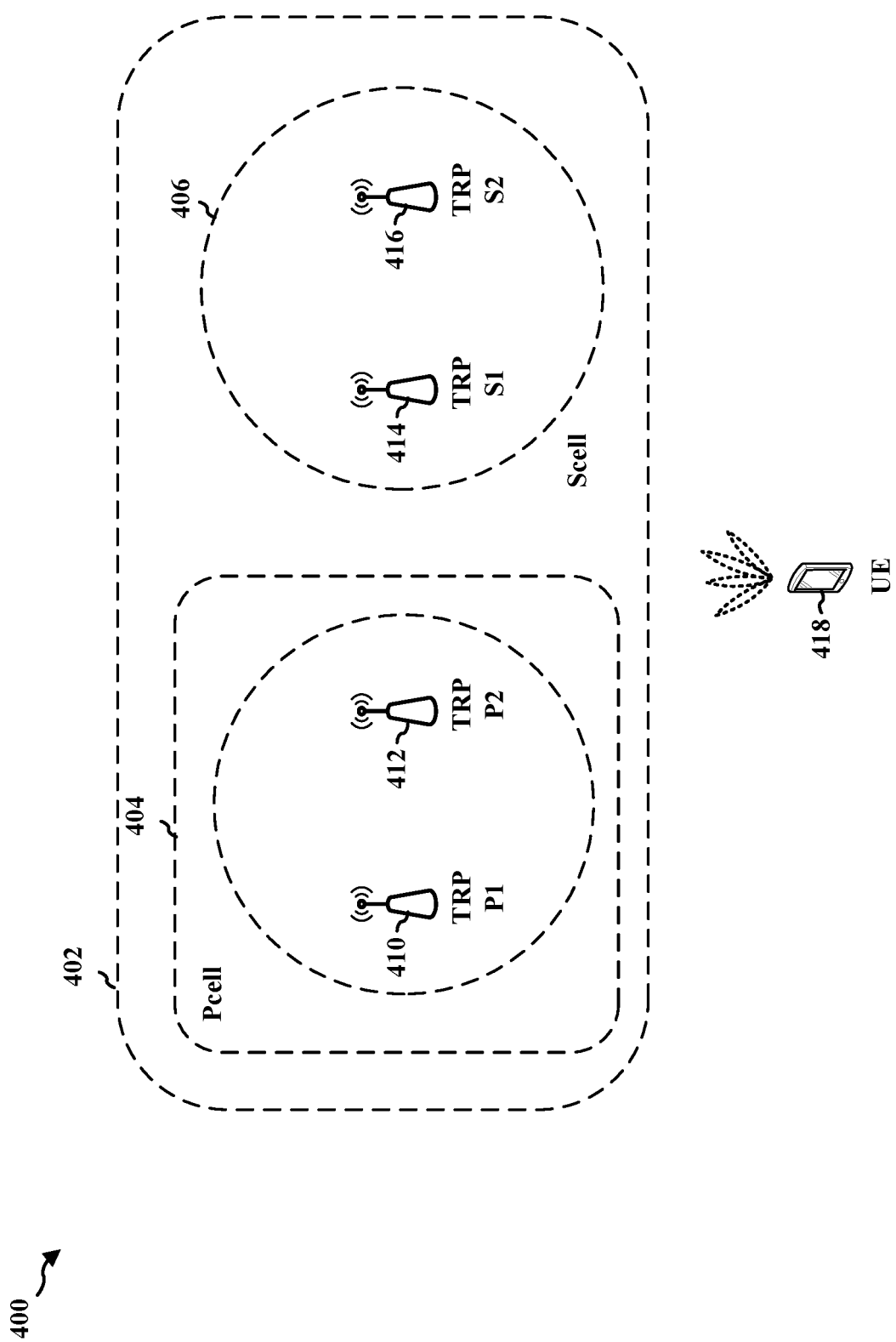
FIG. 4 shows a diagram having a UE configured to communicate with multiple TRPs in a Pcell group and an Scell group.

A network may improve energy savings by putting a TRP into a dormant (i.e., non-active) state. A network may dynamically transition one or more TRPs into a dormant state to provide network energy savings in a multiple TRP (mTRP) network. FIG. 4 shows a diagram 400 having a UE 418 configured to communicate with an mTRP network 402 having a TRP P1 410 and a TRP P2 412 in a Pcell group 404 and a TRP S1 414 and a TRP S2 416 in an Scell group 406. While Pcell group 404 and Scell group 406 are shown in diagram 400 as each having two TRPs, a Pcell group and an Scell group may have more or less TRPs in other aspects. For example, a TRP1 and a TRP2 for a Pcell may be the same as the TRP1 and a TRP2 for an Scell, or alternatively may be two additional, discrete TRPs. The diagram 400 is shown as a logical explanation of either aspect. TRP P1 410 and TRP P2 may each be designed as part of the same quasi co-located (QCL) group, and TRP S1 414 and TRP S2 416 may be the same QCL group. Each of the TRP P1 410, TRP P2 412, TRP S1 414, and TRP S2 416 may be controlled and operated by a single network entity, a plurality of network entities (multiple network entities controlling one TRP), or by different network entities (each network entity controlling a different TRP) in network communication with one another, such as via backhaul connection. Each of the TRP P1 410, TRP P2 412, TRP S1 414, and TRP S2 416 may be active simultaneously, providing maximum throughput in times of a high load. One or more network entities may be configured to put one, more than one, or all of the TRPs of Scell group 406 into a dormant state, and may be configured to put one, more than one, or all but one of the TRPs of the Pcell group 404 into a dormant state. A network entity may be configured to dynamically switch a network between an mTRP state and single TRP (sTRP) state. For example, a network entity may be configured to put one or more TRPs into a dormant state in response to a determination that a network load has met or fallen below a threshold value (i.e., reduced or low load on a base station). A network entity may be configured to provide an indication to the UE 418 to indicate which of the TRPs of TRP P1 410, TRP P2 412, TRP S1 414, and TRP S2 416 may be in a dormant state or an active state. For example, a network entity may be configured to provide explicit TRP dormancy indication (e.g., a transmission indicating which TRPs are active or dormant), indicate TRP dormancy and/or Scell dormancy (i.e., all TRPs in an Scell are dormant), or extend Scell dormancy to one of the TRPs in a Pcell. TRP dormancy may be utilized to dynamically transition one or more TRPs into a dormant state for mTRP or distributed MIMO (D-MIMO) systems.

By allowing a network entity to put a TRP into a dormant state, a network may save power with a small amount of signaling overhead. By jointly indicating TRP dormancy and Scell dormancy, the network entity may leverage Scell dormancy indication. Power savings may also be realized at a UE, as the UE may be configured to skip UL/DL procedures associated with a dormant TRP. For example, in response to receiving an indication that TRP P1 410 is active and TRP P2 412, TRP S1 414, and TRP S2 416 are dormant, the UE 418 may be configured to not communicate with any of TRP P2 412, TRP S1 414, and TRP S2 416 until it receives an indication that one of TRP P2 412, TRP S1 414, and TRP S2 416 are active.

A Pcell group may be configured as part of an Scell group for enabling Pcell TRP dormancy indication. For example, the Pcell group 404 may be designated as a part of the Scell group 406. Since all TRPs of a Pcell group, such as Pcell group 404 in FIG. 4, cannot be dormant, a UE may be configured to interpret an indication that the Scell group 406 is dormant to be that all TRPs but a designated active TRP (e.g., TRP P1 410) of the associated Pcell group 404 are active. In other words, a UE receiving an indication that the Scell group 406 is dormant may interpret that to mean that TRP P2 412 of Pcell group 404 is dormant.

Figure 5:
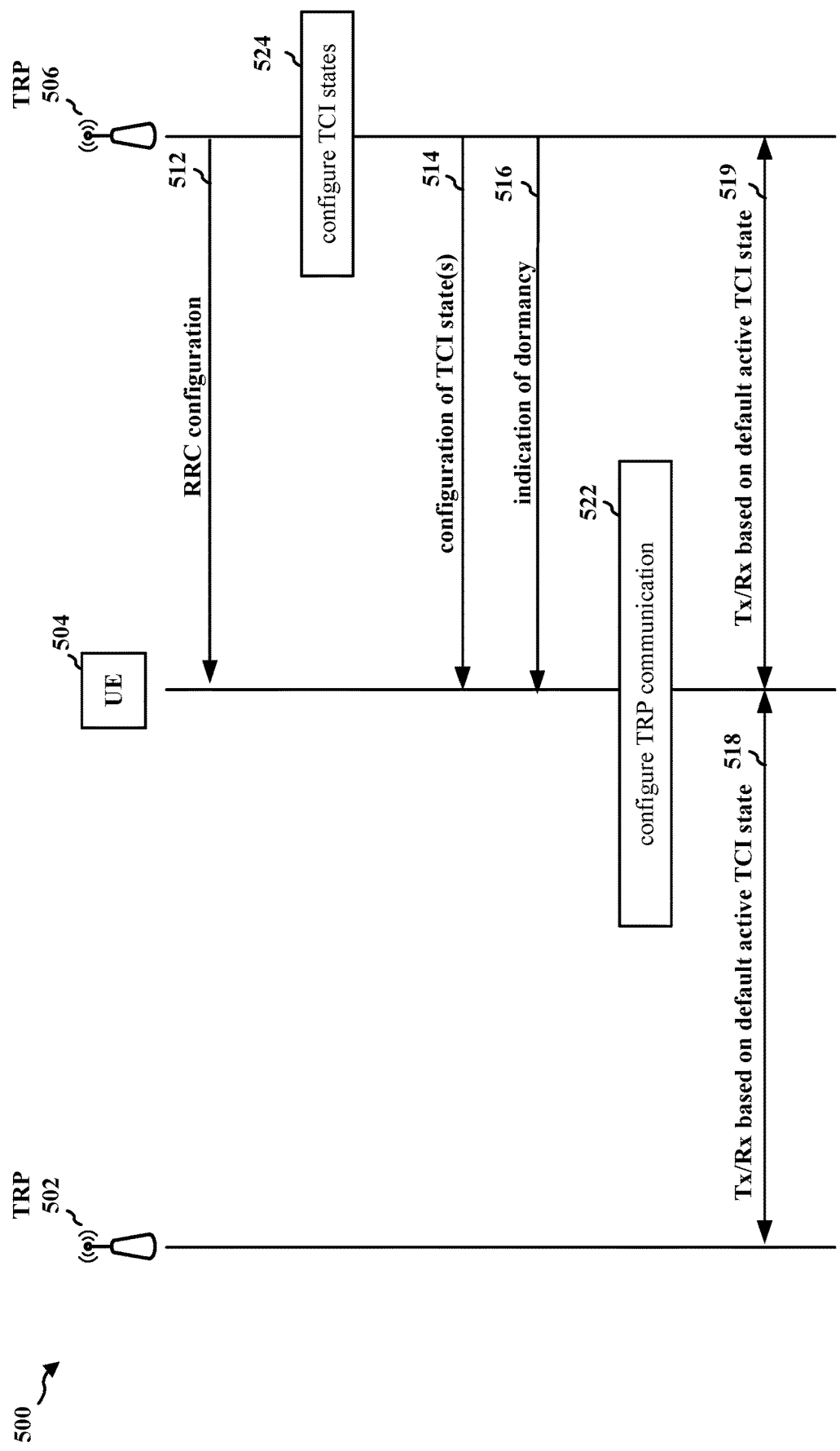
FIG. 5 illustrates a network connection flow diagram showing a UE configured to communicate with a network entity using a plurality of TRPs.

FIG. 5 illustrates a network connection flow diagram 500 showing a UE 504 configured to communicate with a network entity using TRP 502 and TRP 506. The TRP 506 may be configured to transmit the RRC configuration 512 to the UE 504. A network entity controlling the TRP 506, such as base station 102 in FIG. 1, may be configured to configure one or more TCI states 524 of the TRP 506 and/or the TRP 502. Such configurations are discussed in more detail with reference to FIGS. 10-13 below. The TRP 506 may be configured to transmit one or more TCI states 514 to the UE 504. A TCI state may be uniquely mapped to a TRP such that a TCI state may only be mapped to one TRP. A network entity may transmit TCI state(s) of TRP 502 via the transmission of TCI states 514 in addition to TCI state(s) of TRP 506. TRP 506 may be configured to transmit an indication of dormancy 516 to the UE 504, allowing for the UE 504 to determine which TRPs may be active or dormant. Such an indication may be transmitted, for example, using an RRC configuration and/or using a DCI message. The UE 504 may infer which TRPs are active or dormant by cross-referencing an indication of which TCI states are active or dormant with a configuration of TCI states. At 522, the UE 504 may configure TRP communication based on the dormancy of the TRP. For example, in response to the UE 504 determining that TRP 502 is active and TRP 506 is dormant, the UE 504 may be configured to transmit or receive communication signals 518 with the TRP 502. In another aspect, in response to the UE 504 determining that TRP 502 is dormant and TRP 506 is active, the UE 504 may be configured to transmit or receive communication signals 519 with the TRP 506. In another aspect, in response to the UE 504 determining that TRP 502 is active and TRP 506 is active, the UE 504 may be configured to transmit or receive communication signals 518 with the TRP 502 and transmit or receive communication signals 519 with the TRP 506. In other words, at 522 the UE 504 may determine the default active TCI state assumption.

While the connection flow diagram 500 shows the TRP 506 transmitting the RRC configuration 512, transmitting a configuration of one or more TCI states 514, and transmitting an indication of dormancy 516 to the UE 504, the TRP 502 or another TRP may be additionally or alternatively configured to transmit the same, or supplementary, data to the UE 504, as a network entity may communicate with the UE 504 via one of many TRP devices.

Figure 6:
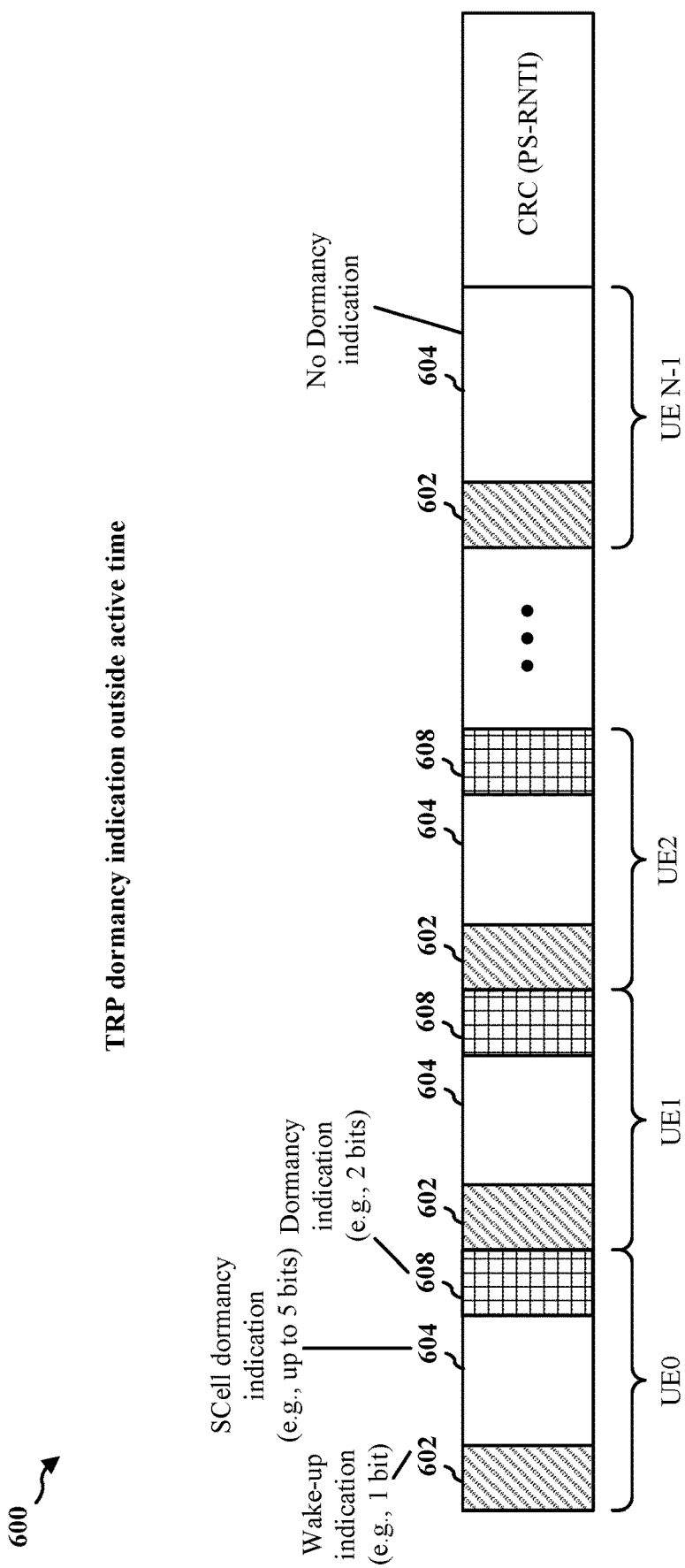
FIG. 6 shows a diagram of a wake up signal (WUS) containing a dormancy indication that may be transmitted to one or more UEs outside of an active discontinuous reception (DRx) time period.

FIG. 6 shows a diagram 600 of a WUS containing a dormancy indication that may be transmitted to one or more UEs 0 to N−1 outside of an active DRx time period. A network entity, such as BS 102 in FIG. 1, may be configured to transmit the WUS to a UE, such as the UE 104 in FIG. 1, for example using PDCCH to include TRP dormancy indication 608. The WUS may be configured to be transmitted to a group of UEs where each UE may have multiple types of information. For example, the WUS may include a wake-up indication 602, an Scell dormancy indication 604, and a dormancy indication 608. The wake-up indication 602 may comprise 1 bit, where the bit may indicate whether the UE should monitor incoming messages from a network entity. The Scell dormancy indication 604, which may comprise up to 5 bits, may indicate which cell group of the Scell will be in a dormant state. In response to receiving an indication of a cell group that will be in a dormant state, the UE may be configured to stop monitoring that cell group of the Scell for data. In some aspects, the dormancy indication 608, may comprise n bits, where the bits may indicate active parameters for each active cell or for a set of n active cells. For example, a dormancy indication 608 of two bits may have a first bit that indicates a dormancy of a first TRP0 and a second bit that indicates a dormancy of a second TRP1. Such an aspect may indicate 00 for TRP0 active and TRP1 active, 01 for TRP0 active and TRP1 dormant, 10 for TRP0 dormant and TRP1 active, and 11 for TRP0 dormant and TRP1 dormant. In some aspects, the Scell dormancy indication 604 may be extended by n bits to provide dormancy indications of TRPs.

In some aspects, the active parameters may correspond to at least a plurality of TCI states or a plurality of CORESET indices. In some aspects, the Scell dormancy indication 604 may comprise the active parameters for a set of cells. For example, the WUS shown in diagram 600 that corresponds to UE N−1 may only comprise the wake-up indication 602 and the Scell dormancy indication 604, where the Scell dormancy indication 604 may comprise the active parameters for a set of cells. The UE N−1 may be a different type of UE (e.g., legacy UE, reduced capacity UE) than any of UE0, UE1, or UE2 such that the UE N−1 supports less services that that of UE0, UE1, or UE2. The enhanced WUS may have a portion that does not include the dormancy indication 608 to be backwards compatible with UEs that support less services than other UEs that may utilize the parameters indicated within dormancy indication 608.

Figure 7:
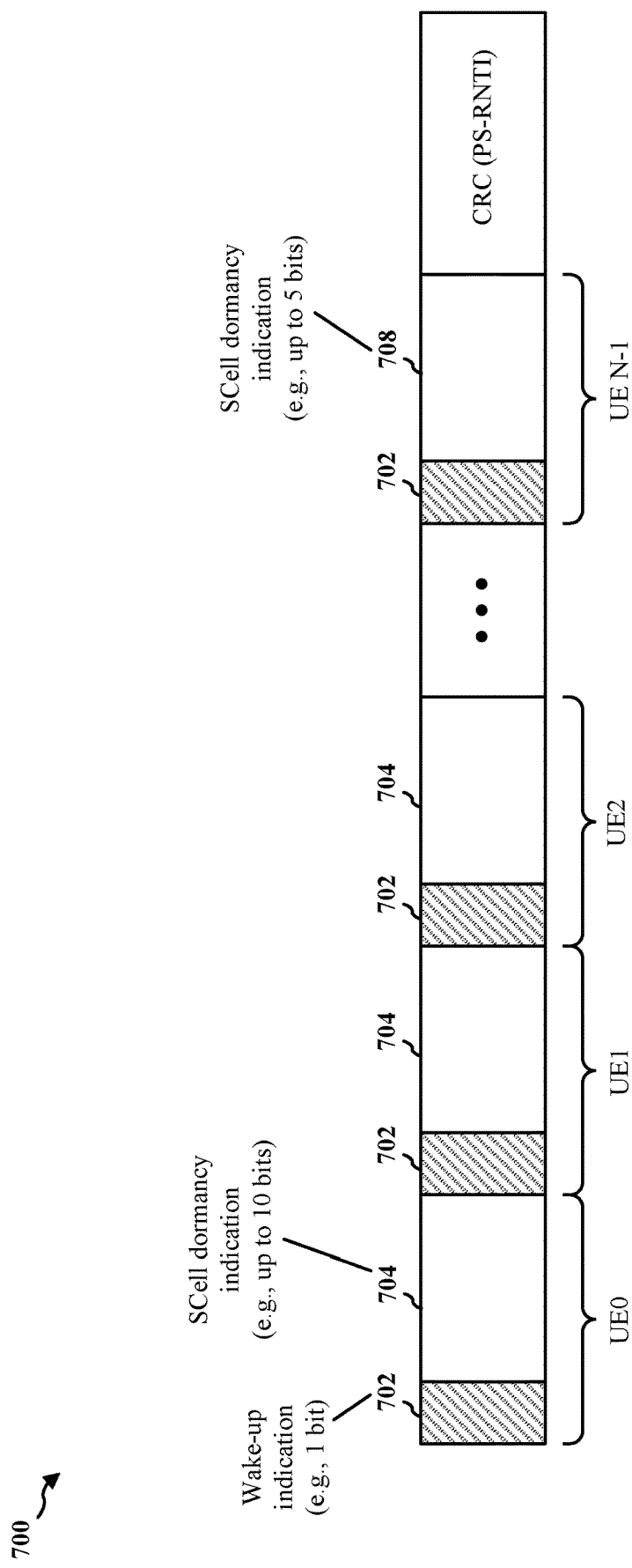
FIG. 7 shows a diagram of an alternative WUS containing a dormancy indication that may be transmitted to one or more UEs outside of an active DRx time period.

FIG. 7 shows a diagram 700 of an alternative WUS containing a dormancy indication that may be transmitted to one or more UEs 0 to N−1 outside of an active DRx time period. A network entity, such as BS 102 in FIG. 1, may be configured to transmit the WUS to a UE, such as the UE 104 in FIG. 1. The WUS may comprise a wake-up indication 702, an Scell dormancy indication 704, and an Scell dormancy indication 708. The Scell dormancy indication 704 of the WUS may comprise one or more bits to indicate the active parameters for a set of cells, such that the Scell dormancy is extended for an Scell group to two bits. The Scell dormancy indication 804 comprise of up to 10 bits. Each group may be identified by a set of two bits, such that the two bits may indicate which cell group of the Scell will be in a dormant state. In some aspects, the active parameters may correspond to at least a plurality of TCI states or a plurality of CORESET indices. The enhanced WUS in the example in FIG. 7 may include an Scell dormancy indication 708 that may be comprised of up to 5 bits. The Scell dormancy indication 708 may comprise the active parameters for a set of cells. For example, the WUS in diagram 700 that corresponds to UE N−1 may only comprise the wake-up indication 702 and the Scell dormancy indication 708, where the Scell dormancy indication 708 may comprise the active parameters for a set of cells. The UE N−1 may be a different type of UE (e.g., legacy UE, reduced capacity UE) than any of UE0, UE1, or UE2 such that the UE N−1 supports less services that that of UE0, UE1, or UE2. The enhanced WUS may have a portion that does not include the Scell dormancy indication 704 of up to 10 bits to be backwards compatible with UEs that support less services than other UEs that may utilize the parameters indicated within Scell dormancy indication 704.

In some instances, TRPs across component carriers (CC) may or may not be the same, such that a first CC and a second CC may both be configured with a CORESET pool index of 0 or 1, while a third CC may be configured with a CORESET pool index of 0. In such instances a first TRP and a second TRP may be in the first CC, while a third TRP and a fourth TRP may be in the second CC, and a fifth TRP may be in the third CC. In such instances, dormancy may be defined based on a group for all cells. For example, each bit of the Scell dormancy indication may correspond to a group of cells, such that the interpretation of the DCI within the WUS is different. The one bit in DCI that indicates whether the group is dormant or not, while the grouping of the cells may be within one CC, across multiple CCs, or both. The one or more parameters associated with the cell within the group of cells may be associated with different carriers. In some instances, the indication indicating the one or more parameters associated with the cell may identify a subset of dormant cells within the group of cells. The subset of cells within the group of cells may be associated with at least one of a CC or multiple CCs.

In some instances, dormancy may be defined based on the group of cells or based on the active parameters associated with the TCI state or the CORESET index. For example, the base station may provide the UE with an indication that indicates that the subset of dormant cells may be within the group of cells or based on the active parameters associated with the TCI state or the CORESET index. In some aspects, the base station may provide the indication via RRC signaling.

In some instances, a Pcell may be configured as part of an Scell group or a TRP group for enabling a Pcell dormancy indication. In such instances, at least one TRP of the Pcell must remain active in order to allow the Pcell to perform control signaling, otherwise the Pcell will be inaccessible. One or more cells of the Pcell may be configured as being part of the group of cells. The one or more parameters of the Pcell may be identified as dormant based on the WUS.

In some aspects, the UE may monitor for PDCCHs associated with an active TRP in mTRP. For example, the UE may be configured with two CORESET pool indices in mDCI and the dormancy indication indicates that a first TCI state is dormant while a second TCI state is active. In such instances, the UE may monitor for PDCCH for the second TCI state that is active. At least one PDCCH may be monitored with an active parameter within the group of cells of the Pcell.

Figure 8:
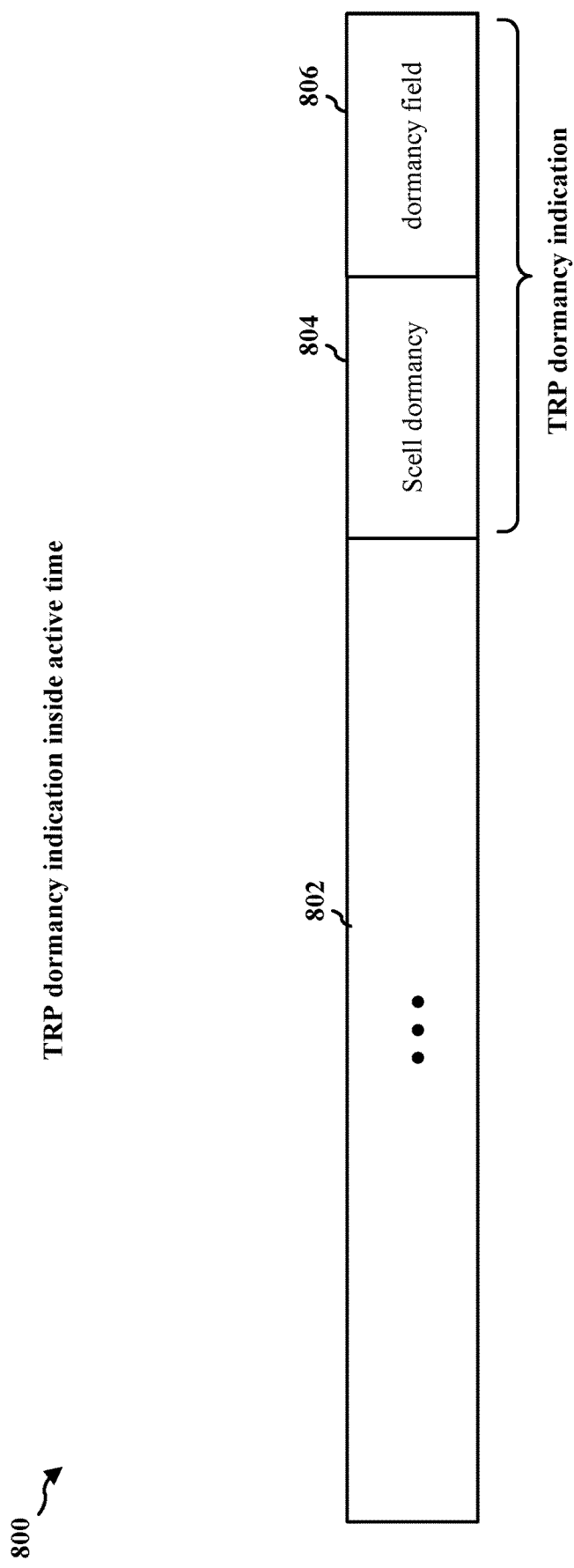
FIG. 8 shows a DCI that may be transmitted to one or more UEs within an active DRx time period.

FIG. 8 shows a DCI 800 that may be transmitted to one or more UEs within an active DRx time period. A network entity, such as BS 102 in FIG. 1, may be configured to transmit the DCI 800 to a UE, such as the UE 104 in FIG. 1. A network entity may be configured to use the DCI 800 to schedule data and provide Scell/TRP dormancy indication. A schedule indication 802 may be used to schedule data within the active time period. An Scell dormancy indication 804 may be similar to the Scell dormancy indication 604 in FIG. 6, and may comprise the active parameters for a set of cells. For example, the Scell dormancy indication 804 may identify an Scell group in DCI 0_1/1_1. The dormancy field 806 may be similar to the dormancy indication 608 in FIG. 6 and may indicate TRP dormancy. In one aspect, the dormancy field 806 may be jointly based on both a field of the DCI and an Scell dormancy indication. For example, the dormancy field 806 may indicate TRP dormancy for each active Scell group determined by Scell dormancy indication 804, or the dormancy field 806 may indicate TRP dormancy for all active Scell groups determined by Scell dormancy indication 804.

Figure 9:
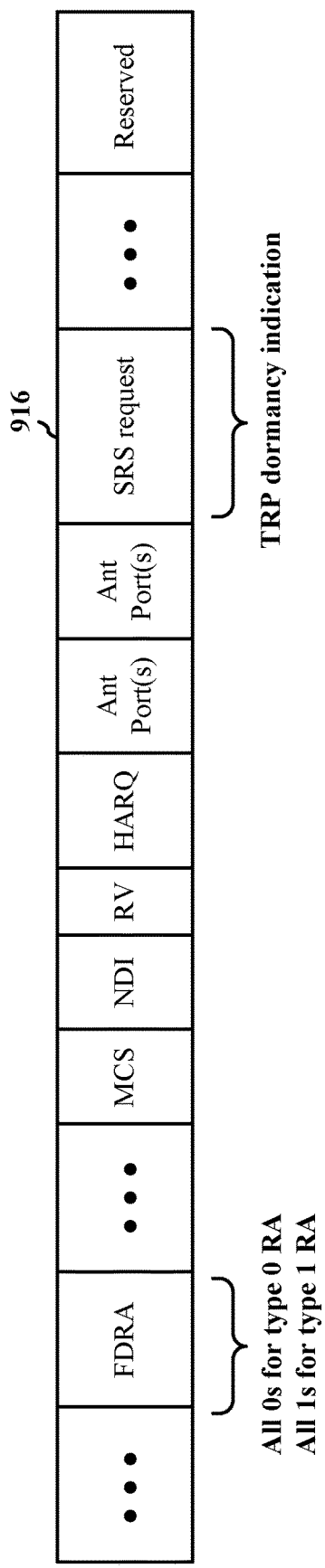
FIG. 9 shows an alternative DCI that may be transmitted to one or more UEs within an active DRx time period.

FIG. 9 shows a DCI 900 that may be transmitted to one or more UEs within an active DRx time period. A network entity, such as BS 102 in FIG. 1, may be configured to transmit the DCI 900 to a UE, such as the UE 104 in FIG. 1. A network entity may be configured to use the DCI 900 to transmit data to a UE, such as Scell/TRP dormancy indication, without scheduling data. Such a DCI may be used to reinterpret an Scell dormancy indication to include both Scell/TRP dormancy indication. For example, two bits may be used to interpret Scell/TRP dormancy for an Scell having two TRPs. Additionally, or alternatively, a UE may be configured to interpret Scell dormancy using a TCI field for single DCI (sDCI) or a coresetPoolIndex field for multiple DCI (mDCI). An existing field of a DCI may be used to indicate Scell dormancy. Here, the SRS request field 916 may be used to indicate Scell dormancy indication. One of the bits of the Scell may also be mapped to interpret TRP dormancy for a Pcell (e.g., the first or last indicated value).

Figure 10:
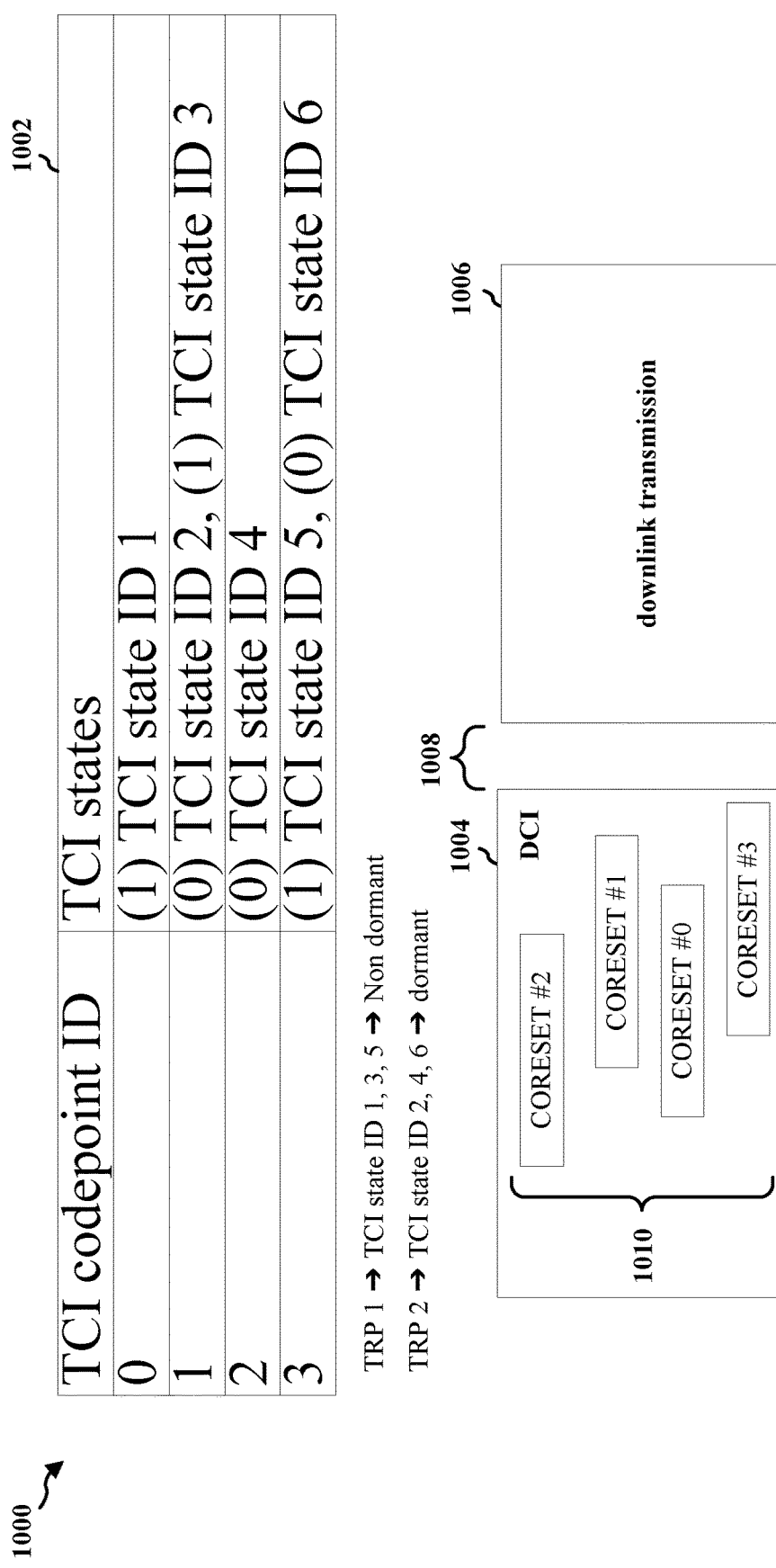
FIG. 10 shows a diagram of data that may be received by a UE from a network entity.

FIG. 10 shows a diagram 1000 of data that has been received by a UE, such as the UE 104 in FIG. 1, from a network entity, such as the BS 102 in FIG. 1. The UE may have a set of TCI codepoints 1002, a set of CORESETs 1010 transmitted in a DCI 1004, and a downlink transmission 1006. The downlink transmission may be any suitable transmission scheduled for download by a UE, such as a PDSCH, a CORESET, or a CSI-RS. The DCI 1004 may be transmitted in the slot previous to the downlink transmission 1006. The set of CORESETs 1010 may be encoded in the DCI 1004. Here, the DCI 1004 contains a set of CORESETs

1010 comprising CORESET #0, CORESET #1, CORESET #2, and CORESET #3. The UE may receive the downlink transmission 1006 from a network entity with a scheduling offset 1008 between the downlink transmission 1006 and reception of the DCI. The transmission scheme of the UE may be RRC configured by an RRC, which may indicate a transmission scheme of, for example, a single TCI (sTCI) state, a time division multiplexing (TDM) multi-TCI (mTCI) state, a frequency division multiplexing (FDM) mTCI state, a spatial division multiplexing (SDM) mTCI state, and/or a single frequency network (SFN) mTCI state. Where the UE sets a default TCI assumption to a TCI state ID, the UE may be configured to, by default, transmit and receive communication with the TRP associated with the TCI state ID.

A UE may be configured to use default TCI/QCL assumptions for the downlink transmission 1006 scheduled by the DCI 1004 where the downlink transmission 1006 comprises a PDSCH downlink transmission.

For example, if the UE determines that the scheduling offset 1008 between the PDSCH downlink transmission 1006 and the DCI 1004 meets or is less than a threshold value, the UE may be configured to set the default TCI/QCL assumption for a single TCI PDSCH beam to use the TCI in the CORESET with the lowest ID in the latest slot. Here, that may be CORESET #0, as 0 is the lowest ID value from the set of CORESETs 1010. However, CORESET #0 has only one TCI state ID 4 that is not active, so a UE configured to receive and understand dormancy data may then select CORESET #1 as the CORESET with the lowest ID in the previous slot with an active TCI state ID. In one aspect, if the UE determines that TCI fields are not present in the DCI 1004, then the UE may be configured to set the TCI/QCL assumption for a single TCI PDSCH beam to use the scheduling CORESET for the PDSCH downlink transmission 1006. In another aspect, if the UE determines that the scheduling offset 1008 between the PDSCH downlink transmission 1006 and the DCI 1004 meets or is less than a threshold value, then the UE may be configured to set the default TCI/QCL assumption for a single TCI PDSCH beam to use the first TCI in an SFN CORESET. In another aspect, if the UE determines that TCI fields are not present in the DCI 1004, then the UE may be configured to set the default TCI/QCL assumption for a single TCI PDSCH beam to use the first TCI in an SFN CORESET.

In one aspect, if the UE determines that the scheduling offset 1008 between the PDSCH downlink transmission 1006 and the DCI 1004 meets or is less than a threshold value, the UE may be configured to set the default TCI/QCL assumption for a TDM/SDM/FDM/SFN mTCI state PDSCH scheme to use the lowest ID TCI codepoint that has multiple TCI states (e.g., two states). Here, that would be TCI Codepoint #1, as TCI Codepoint #1 has the lowest ID that has two states. In one aspect, if the UE determines that the TCI fields are not present in the DCI 1004, the UE may be configured to set the default TCI/QCL assumption for an SFN mTCI state to use the TCI states of the scheduling SFN CORESET for the PDSCH downlink transmission 1006.

In one aspect, if the UE determines that the scheduling offset 1008 between the PDSCH downlink transmission 1006 and the DCI 1004 is less than a threshold value and the RRC configured transmission scheme is a multi-TCI state scheme (e.g., TDM, FDM, SDM, or SFN), then the UE may be configured to set the default TCI/QCL assumption for PDSCH reception to use an active TCI state of a lowest. TCI codepoint ID having multiple TCI states (e.g., two states). Here, that would be TCI state ID 3 since the lowest codepoint ID having multiple TCI states is TCI codepoint ID 1, and TCI state ID 2 is not active while TCI state ID 3 is active.

In one aspect, if the UE receives a DCI indication of TRP dormancy, and the UE determines that the scheduling offset 1008 between the PDSCH downlink transmission 1006 and the DCI 1004 is less than a threshold value and the RRC configured transmission scheme is an mTCI scheme (e.g., TDM, FDM, SDM, or SFN), then the UE may be configured to set the default TCI/QCL assumption for PDSCH reception to use an active TCI state of a lowest TCI codepoint having one TCI state. Here, that would be TCI state ID 1 since the lowest codepoint ID having one active TCI state is TCI codepoint ID 0, and TCI state ID 1 is active.

In one aspect, if the UE receives a DCI indication of TRP dormancy, and the UE determines that the scheduling offset 1008 between the PDSCH downlink transmission 1006 and the DCI 1004 meets or is less than a threshold value and the RRC configured transmission scheme is an mTCI scheme (e.g., TDM, FDM, SDM, or SFN), then the UE may be configured to set the default TCI/QCL assumption for PDSCH reception to use an active TCI state of a CORESET having a lowest ID in a previous slot and having multiple TCI states (e.g., two states). Here, that would be TCI state ID 1 since the lowest codepoint ID having multiple TCI states is CORESET #1, and TCI state ID 1 is active and TCI state ID 2 is not active.

In one aspect, if the UE receives a DCI indication of TRP dormancy, and the UE determines that the scheduling offset 1008 between the PDSCH downlink transmission 1006 and the DCI 1004 meets or is less than a threshold value and the RRC configured transmission scheme is an mTCI scheme (e.g., TDM, FDM, SDM, or SFN), then the UE may be configured to set the default TCI/QCL assumption for PDSCH reception to use an active TCI state of the CORESET having the lowest IL) in the previous slot having one TCI state. Here, that may be TCI state ID 5 since the lowest CORESET ID having one TCI state is CORESET #0, but TCI state ID 4 is not active, and the next lowest CORESET ID having one TCI state is CORESET #2, and TCI state ID 5 is active.

In one aspect, if the UE receives a DCI indication of TRP dormancy, and the UE determines that the scheduling offset 1008 between the PDSCH downlink transmission 1006 and the DCI 1004 is less than a threshold value and the RRC configured transmission scheme is an mTCI scheme (e.g., TDM, FDM, SDM, or SFN), then the UE may be configured to set the default TCI/QCL assumption for PDSCH reception based on rule of combination of (1) an active TCI state of a lowest TCI codepoint ID having multiple TCI states, (2) an active TCI state of a lowest TCI codepoint having one TCI state, (3) an active TCI state of a CORESET having a lowest ID in a previous slot and having multiple TCI states, or (4) an active TCI state of the CORESET having the lowest ID in the previous slot having one TCI state, in an order of priority. For example, a UE may be configured to first use an active TCI state of a lowest TCI codepoint having one TCI state, but if no active TCI state having one TCI state may be found then use an active TCI state of a lowest TCI codepoint ID having multiple TCI states (e.g., two states). In another aspect, a UE may be configured to first use an active TCI state of the CORESET having the lowest ID in the previous slot having one TCI state, but if no active TCI state may be found, then use an active TCI state of a CORESET having a lowest ID in a previous slot and having multiple TCI states (e.g., two states).

In one aspect, if the UE receives a DCI indication of TRP dormancy, and the UE determines that the DCI 1004 scheduling the PDSCH downlink transmission 1006 does not have a TCI field in the DCI payload and the RRC configured transmission scheme is an mTCI scheme (e.g., TDM, FDM, SDM, or SFN), then the UE may be configured to set the default TCI/QCL assumption for a PDSCH default beam to use an active TCI state of a CORESET having a lowest ID in a previous slot and having multiple TCI states (e.g., two states). Here, that may be TCI state ID 1, since CORSET #0 only has one TCI state, and CORESET #1 has multiple TCI states, but TCI state ID 1 is active while TCI state ID 2 is dormant.

In one aspect, if the UE receives a DCI indication of TRP dormancy, and the UE determines that the DCI 1004 scheduling the PDSCH downlink transmission 1006 does not have a TCI field in the DCI payload and the RRC configured transmission scheme is an mTCI scheme (e.g., TDM, FDM, SDM, or SFN), then the UE may be configured to set the default TCI/QCL assumption for a PDSCH default beam to use an active TCI state of the CORESET having the lowest ID in the previous slot and having one TCI state. Here, that may be TCI state ID 5, since CORSET #0 has one TCI state, but TCI state ID 4 is dormant, CORESET #1 has two TCI states, CORESET #2 has one TCI state and TCI state ID 5 is active.

In one aspect, if the UE receives a DCI indication of TRP dormancy, and the UE determines that the DCI 1004 scheduling the PDSCH downlink transmission 1006 does not have a TCI field in the DCI payload and the RRC configured transmission scheme is an mTCI scheme (e.g., TDM, FDM, SDM, or SFN), then the UE may be configured to set the default TCI/QCL assumption for a PDSCH default beam to use a combination of (1) an active TCI state of a CORESET having a lowest ID in a previous slot and having multiple TCI states, or (2) an active TCI state of the CORESET having the lowest ID in the previous slot and having one TCI state, in an order of priority. For example, a UE may be configured to first use an active TCI state of the CORESET having the lowest ID in the previous slot and having one TCI state, but if no active TCI state may be found, then use an active TCI state of a CORESET having a lowest ID in a previous slot and having multiple TCI states (i.e., one TCI state CORESET has a higher priority than an SFN CORESET), Here, that may be TCI state 1 if CORESET #2 was not contained in DCI 1004, since if CORESET #2 was not contained in DCI 1004 the set of CORESETs 1010 would not contain a coreset having one TCI state that has an active TCI, and the next lowest CORESET having multiple TCI states is CORESET #1, and TCI state ID 1 is active while TCI state ID 2 is not active.

In one aspect, if the UE receives a DCI indication of TRP dormancy, and the UE determines that the DCI 1004 scheduling the PDSCH downlink transmission 1006 does not have a TCI field in the DCI payload and the RRC configured transmission scheme is an mTCI scheme (e.g., TDM, FDM, SDM, or SFN), then the UE may be configured to set the default TCI/QCL assumption for a PDSCH default beam to use an active TCI state of any CORESET having a lowest ID in a previous slot. Here, that may be TCI state ID 1, since CORESET #0 has the lowest CORESET ID, but TCI state ID 4 is dormant, and CORESET #1 has the next lowest CORESET ID, and TCI state ID 1 is active while TCI state ID 2 is not active.

A UE may be configured to use default TCI/QCL assumptions for the downlink transmission 1006 scheduled by the DCI 1004 where the downlink transmission 1006 comprises a CSI-RS downlink transmission.

In one aspect, if the UE determines that the scheduling offset 1008 between the CSI-RS downlink transmission 1006 and the DCI 1004 meets or is less than a threshold value and the UE receives overlapping DL transmissions for the CSI-RS downlink transmission 1006, then the UE may be configured to set the default TCI/QCL assumption for a CSI-RS default beam to use the QCL/TCI state of the overlapping DL transmission. In response to the UE determining that the overlapping CSI-RS downlink transmission 1006 has multiple TCI states (e.g., for TDM/FDM/SDM or SFN), the UE may use the first TCI state of the PDSCH downlink transmission 1006.

In one aspect, if the UE determines that the scheduling offset 1008 between the CSI-RS downlink transmission 1006 and the DCI 1004 meets or is less than a threshold value and the UE does not receive overlapping DL transmissions for the CSI-RS downlink transmission 1006, then the UE may be configured to set the default TCI/QCL assumption for a CSI-RS default beam to use the QCL/TCI state of the CORESET with the lowest ID in the previous slot. Here, that may be TCI state ID 3, since the CORESET having the lowest ID is CORESET #0. However, since TCI state ID 4 is not active, the UE may be configured to then use the next highest CORESET having an active TCI, which would be TCI state ID 1 of CORESET #1, as CORESET #1 is the next highest CORESET ID, and TCI state ID 1 is active and TCI state ID 2 is not active. In one aspect, if the CORESET has at least two active TCI state IDs, the UE may set the default TCI/QCL assumption for the CSI-RS default beam to use the first TCI state in the CORESET.

In one aspect, if the UE receives a DCI indication of TRP dormancy, and the UE determines that the scheduling offset 1008 between the CSI-RS downlink transmission 1006 and the DCI 1004 meets or is less than a threshold value and the channel state information (CSI) overlaps with a PDSCH, a CORESET, or an additional CSI-RS having multiple TCI states, then the UE may be configured to set the default TCI/QCL assumption for a CSI-RS default beam to use an active TCI state of the PDSCH, the CORESET, or the additional CSI-RS.

In one aspect, if the UE receives a DCI indication of TRP dormancy, and the UE determines that the scheduling offset 1008 between the CSI-RS downlink transmission 1006 and the DCI 1004 meets or is less than a threshold value and the UE does not receive overlapping DL transmissions for the CSI-RS downlink transmission 1006 (i.e. the CSI does not overlap with a downlink signal or a downlink channel), then the UE may be configured to set the default TCI/QCL assumption for a CSI-RS default beam to use an active TCI state of a CORESET having a lowest ID in a previous slot and having multiple TCI states (e.g., two states). Here, that may be TCI state ID 1, since CORSET #0 only has one TCI state, and CORESET #1 has two TCI states, but TCI state ID 1 is active while TCI state ID 2 is dormant.

In one aspect, if the UE receives a DCI indication of TRP dormancy, and the UE determines that the scheduling offset 1008 between the CSI-RS downlink transmission 1006 and the DCI 1004 meets or is less than a threshold value and the UE does not receive overlapping DL transmissions for the CSI-RS downlink transmission 1006 (i.e. the CSI does not overlap with a downlink signal or a downlink channel), then the UE may be configured to set the default TCI/QCL assumption for a CSI-RS default beam to use an active TCI state of the CORESET having the lowest ID in the previous slot and having one TCI state. Here, that may be TCI state ID 5, since CORSET #0 has one TCI state, but TCI state ID 4 is dormant, CORESET #1 has two TCI states, CORESET #2 has one TCI state and TCI state ID 5 is active.

In one aspect, if the UE receives a DCI indication of TRP dormancy, and the UE determines that the scheduling offset 1008 between the CSI-RS downlink transmission 1006 and the DCI 1004 meets or is less than a threshold value and the UE does not receive overlapping DL transmissions for the CSI-RS downlink transmission 1006 (i.e. the CSI does not overlap with a downlink signal or a downlink channel), then the UE may be configured to set the default TCI/QCL assumption for a CSI-RS default beam to use a combination of (1) an active TCI state of a CORESET having a lowest ID in a previous slot and having multiple TCI states, or (2) an active TCI state of the CORESET having the lowest ID in the previous slot and having one TCI state, in an order of priority. For example, a UE may be configured to first use an active TCI state of the CORESET having the lowest IL) in the previous slot and having one TCI state, but if no active TCI state may be found, then use an active TCI state of a CORESET having a lowest ID in a previous slot and having multiple TCI states (i.e., one TCI state CORESET has a higher priority than an SFN CORESET). Here, that may be TCI state 1 if CORESET #2 was not contained in DCI 1004, since if CORESET #2 was not contained in DCI 1004 the set of CORESETs 1010 would not contain a coreset having one TCI state that has an active TCI, and the next lowest CORESET having multiple TCI states is CORESET #1, and TCI state ID 1 is active while TCI state ID 2 is not active.

In one aspect, if the UE receives a DCI indication of TRP dormancy, and the UE determines that the scheduling offset 1008 between the CSI-RS downlink transmission 1006 and the DCI 1004 meets or is less than a threshold value and the UE does not receive overlapping DL transmissions for the CSI-RS downlink transmission 1006 (i.e. the CSI does not overlap with a downlink signal or a downlink channel), then the UE may be configured to use an active TCI state of any CORESET having a lowest ID in a previous slot. Here, that may be TCI state ID 1, since CORESET #0 has the lowest CORESET ID, but TCI state ID 4 is dormant, and CORESET #1 has the next lowest CORESET ID, and TCI state ID 1 is active while TCI state ID 2 is not active.

Figure 11:
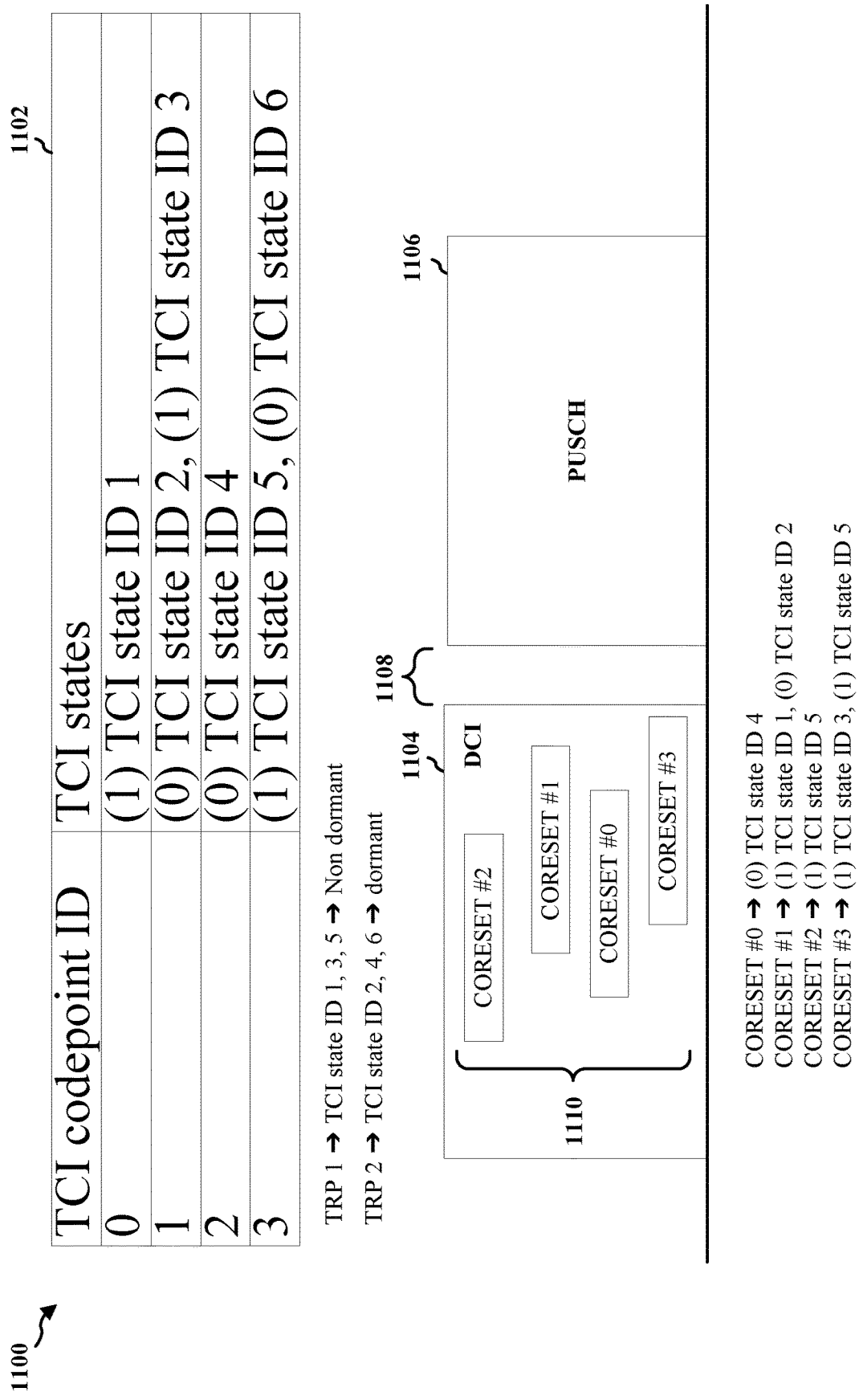
FIG. 11 shows a diagram of a PUSCH that may be scheduled for an upload from a UE to a network entity.

FIG. 11 shows a diagram 1100 of a PUSCH 1106 that has been scheduled for an upload from a UE, such as the UE 104 in FIG. 1, to a network entity, such as the BS 102 in FIG. 1. The UE may have a set of TCI codepoints 1102, a set of CORESETs 1110 transmitted in a DCI 1104, and a scheduled PUSCH 1106. The DCI 1104 may be transmitted in the slot previous to the scheduled PUSCH 1106. The DCI 1104 may schedule a scheduling offset 1108 between the DCI 1104 and the PUSCH 1106. The set of CORESETs 1110 may be encoded in the DCI 1104. Here, the DCI 1104 contains a set of CORESETs 1110 comprising CORESET #0, CORESET #1, CORESET #2, and CORESET #3. Where the UE sets a default TCI assumption to a TCI state ID, the UE may be configured to, by default, transmit and receive communication with the TRP associated with the TCI state ID.

A UE may be configured to use default TCI/QCL assumptions for the PUSCH 1106 scheduled by the DCI 1004.

For example, if the UE determines that (1) the scheduled PUSCH 1106 is scheduled using a DCI format 0_0, (2) a default PUSCH flag is set by the DCI 1004 (e.g., enableDefaultBeamPL-ForPUSCH0_0 is configured in FR2), and (3) a PUCCH is not configured on an active UL BWP cell, the UE may be configured to set the default TCI/QCL assumption for the PUSCH 1106 to use a TCI state of the CORESET with the lowest ID in the active UL BWP. Here, that may be CORESET #0 as 0 is the lowest ID value from the set of CORESETs 1110. However, CORESET #0 has only one TCI state ID 4 that is not active, so a UE configured to receive and understand dormancy data may then select CORESET #1 as the CORESET with the lowest ID in the previous slot with an active TCI state ID. Where a CORESET has multiple TCI states (e.g., two states), the UE may be configured to choose the first TCI state of the CORESET as the default beam and PL-RS for the PUSCH 1106.

In one aspect, if the UE receives a DCI indication of TRP dormancy, and the UE determines that the DCI 1104 uses a DCI format 0_0 and for which a default beam for pathloss is enabled in FR2 without a PUCCH resource on an active UL BWP cell or without having a spatial relation configured in any PUCCH resource on the active UL BWP cell, the UE may be configured to set the default TCI/QCL assumption for the default beam and PL-RS to use an active TCI state of a CORESET having a lowest ID in an active DL BWP and having multiple TCI states. Here, that may be TCI state ID 1 since CORESET #0 has the lowest CORESET ID but only has one TCI state ID, and the next lowest CORESET #1 has two TCI states, and TCI state ID 1 is active while TCI state ID 2 is not active.

In one aspect, if the UE receives a DCI indication of TRP dormancy, and the UE determines that the DCI 1104 uses a DCI format 0_0 and for which a default beam for pathloss is enabled in FR2 without a PUCCH resource on an active UL BWP cell or without having a spatial relation configured in any PUCCH resource on the active UL BWP cell, the UE may be configured to set the default TCI/QCL assumption the default beam and PL-RS to use an active TCI state of the CORESET having the lowest ID in the active downlink BWP and having one TCI state. Here, that may be TCI state ID 5 since CORESET #0 has the lowest CORESET ID but only has one dormant TCI state ID 4, CORESET #1 has two TCI states, and the next lowest CORESET #2 has one active TCI state ID 5.

In one aspect, if the UE receives a DCI indication of TRP dormancy, and the UE determines that the DCI 1104 uses a DCI format 0_0 and for which a default beam for pathloss is enabled in FR2 without a PUCCH resource on an active UL BWP cell or without having a spatial relation configured in any PUCCH resource on the active UL BWP cell, the UE may be configured to set the default TCI/QCL assumption the default beam and PL-RS to use an active TCI state of the CORESET having the lowest ID with the active TCI state in the active DL BWP.

In one aspect, if the UE receives a DCI indication of TRP dormancy, and the UE determines that the DCI 1104 uses a DCI format 0_0 and for which a default beam for pathloss is enabled in FR2 without a PUCCH resource on an active UL BWP cell or without having a spatial relation configured in any PUCCH resource on the active UL BWP cell, the UE may be configured to set the default TCI/QCL assumption the default beam and PL-RS to use a combination of (1) an active TCI state of a CORESET having a lowest ID in an active DL BWP and having multiple TCI states, (2) an active TCI state of the CORESET having the lowest ID in the active downlink BWP and having one TCI state, or (3) an active TCI state of the CORESET having the lowest ID with the active TCI state in the active DL BWP, in an order of priority. For example, a UE may be configured to first use an active TCI state of the CORESET having the lowest ID in the active downlink BWP and having one TCI state, but if no active TCI state may be found, then use an active TCI state of a CORESET having a lowest ID in an active DL BWP and having multiple TCI states. Here, that may be TCI state 1 if CORESET #2 was not contained in DCI 1004, since if CORESET #2 was not contained in DCI 1004 the set of CORESETs 1010 would not contain a coreset having one TCI state that has an active TCI, and the next lowest CORESET having multiple TCI states is CORESET #1, and TCI state ID 1 is active while TCI state ID 2 is not active.

Figure 12:
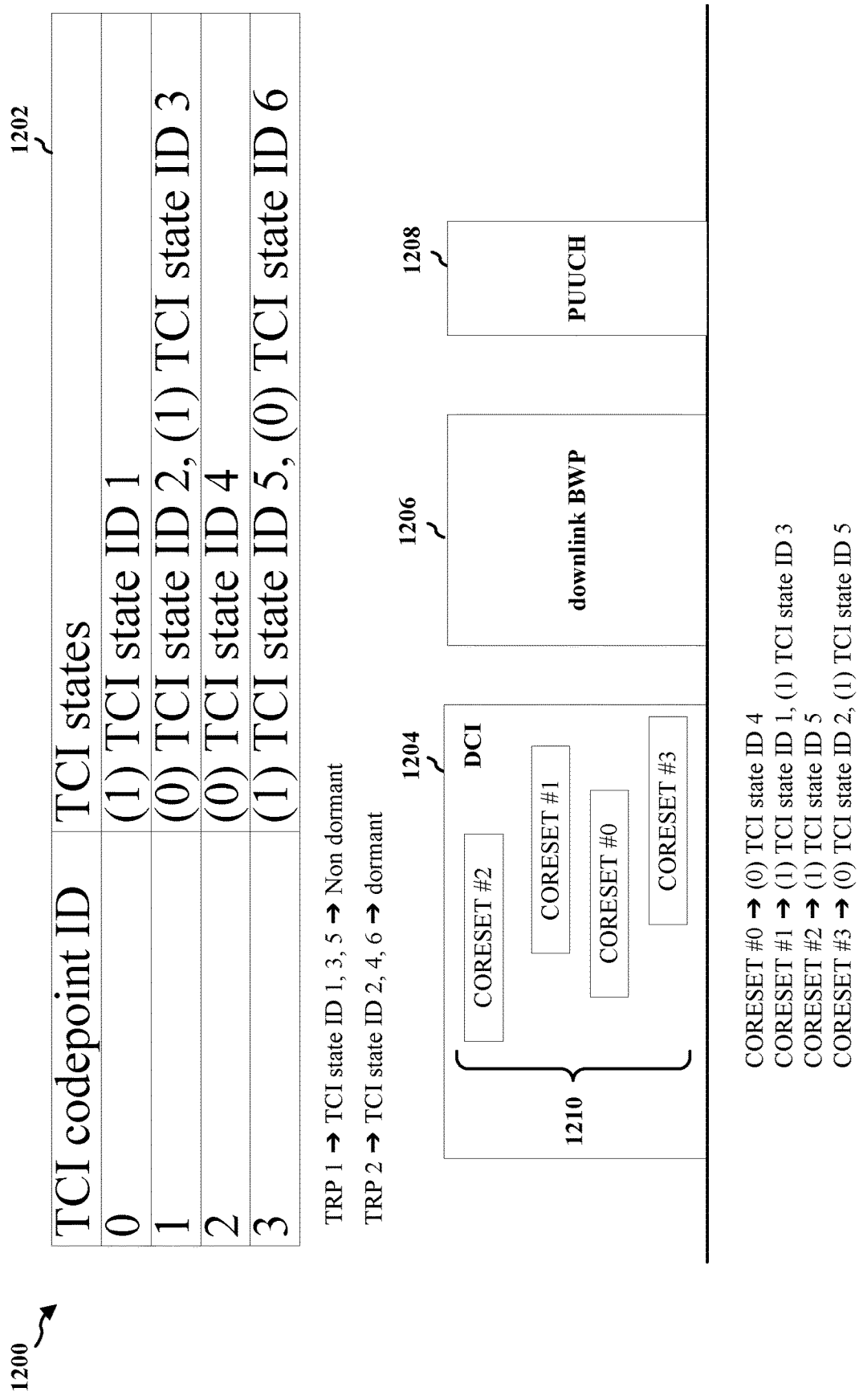
FIG. 12 shows a diagram of a PUCCH that may be scheduled for an upload from a UE to a network entity.

FIG. 12 shows a diagram 1200 of a PUCCH 1208 that has been scheduled for an upload from a UE, such as the UE 104 in FIG. 1, to a network entity, such as the BS 102 in FIG. 1. The UE may have a set of TCI codepoints 1202, a set of CORESETs 1210 transmitted in a DCI 1204, a scheduled DL BWP 1206, and a scheduled PUCCH 1208. The scheduled DL BWP 1206 may be any suitable transmission scheduled for download by a UE, such as a PDSCH. The set of CORESETs 1210 may be encoded in the DCI 1204. Here, the DCI 1204 contains a set of CORESETs 1210 comprising CORESET #0, CORESET #1, CORESET #2, and CORESET #3. Where the UE sets a default TCI assumption to a TCI state ID, the UE may be configured to, by default, transmit and receive communication with the TRP associated with the TCI state ID.

For example, if the UE determines that the scheduled PUCCH 1208 does not have a configured pathloss reference signal (PL-RS) or a configured spatial relation information and a default PL-RS flag is set by the DCI 1004 (e.g., enableDefaultBeamPL-ForPUCCH is configured in FR2), the UE may be configured to set the default TCI/QCL assumption for the PUCCH to use the TCI state of the CORESET with the lowest ID in the active DL BWP 1206. In response to determining that the CORESET with the lowest ID in the active DL BWP 1206 has multiple TCI states (e.g., two states), the UE may be configured to select the first TCI state of the CORESET as the default beam and PL-RS. Here, that may be TCI state ID 1, since CORESET #0 has only one TCI state ID 4, and the next highest CORESET #1 has active TCI state ID 1 and active TCI state ID 3. TCI state ID 1 is the first TCI state of the two TCI states of CORESET #1.

In one aspect, if the UE receives a DCI indication of TRP dormancy, and the UE determines that the scheduled PUCCH 1208 does not have a configured PL-RS or spatial relation information and a default PUCCH flag is set by the DCI 1204 (e.g., enableDefaultBeamPL-ForPUCCH0_0 is configured in FR2), the UE may be configured to set the default TCI/QCL assumption for the PUCCH 1208 to use an active TCI state of a CORESET having a lowest ID in the active DL BWP 1206 and having multiple TCI states. Here, that may be TCI state ID 1 since CORESET #0 has the lowest CORESET ID but only has one TCI state ID, and the next lowest CORESET #1 has two TCI states, and TCI state ID 1 is active while TCI state ID 2 is not active.

In one aspect, if the UE receives a DCI indication of TRP dormancy, and the UE determines that the scheduled PUCCH 1208 does not have a configured PL-RS or spatial relation information and a default PUCCH flag is set by the DCI 1204 (e.g., enableDefaultBeamPL-ForPUCCH0_0 is configured in FR2), the UE may be configured to set the default TCI/QCL assumption for the PUCCH 1208 to use an active TCI state of the CORESET having the lowest ID in the active DL BWP 1206 and having one TCI state. Here, that may be TCI state ID 5 since CORESET #0 has the lowest CORESET ID but only has one dormant TCI state ID 4, CORESET #1 has two TCI states, and the next lowest CORESET #2 has one active TCI state ID 5.

In one aspect, if the UE receives a DCI indication of TRP dormancy, and the UE determines that the scheduled PUCCH 1208 does not have a configured. PL-RS or spatial relation information and a default PUCCH flag is set by the DCI 1204 (e.g., enableDefaultBeamPL-ForPUCCH0_0 is configured in FR2), the UE may be configured to set the default TCI/QCL assumption for the PUCCH 1208 to use an active TCI state of the CORESET having the lowest ID with the active TCI state in the active downlink BWP.

In one aspect, if the UE receives a DCI indication of TRP dormancy, and the UE determines that the scheduled PUCCH 1208 does not have a configured PL-RS or spatial relation information and a default PUCCH flag is set by the DCI 1204 (e.g., enableDefa:ultBeamPL-ForPUCCH0_0 is configured in FR2), the UE may be configured to set the default TCI/QCL assumption for the PUCCH 1208 to use a combination of (1) an active TCI state of a CORESET having a lowest ID in the active DL BWP 1206 and having multiple TCI states, (2) an active TCI state of the CORESET having the lowest ID in the active DL BWP 1206 and having one TCI state, or (3) an active TCI state of the CORESET having the lowest ID with the active TCI state in the active DL BWP 1206, in an order of priority. For example, a UE may be configured to first use an active TCI state of the CORESET having the lowest ID in the active DL BWP 1206 and having one TCI state, but if no active TCI state may be found, then use an active TCI state of a CORESET having a lowest ID in an active DL BWP 1206 and having multiple TCI states. Here, that may be TCI state 1 if CORESET #2 was not contained in DCI 1004, since if CORESET #2 was not contained in DCI 1204 the set of CORESETs 1210 would not contain a coreset having one TCI state that has an active TCI, and the next lowest CORESET having two TCI states is CORESET #1, and TCI state ID 1 is active while TCI state ID 2 is not active.

Figure 13:
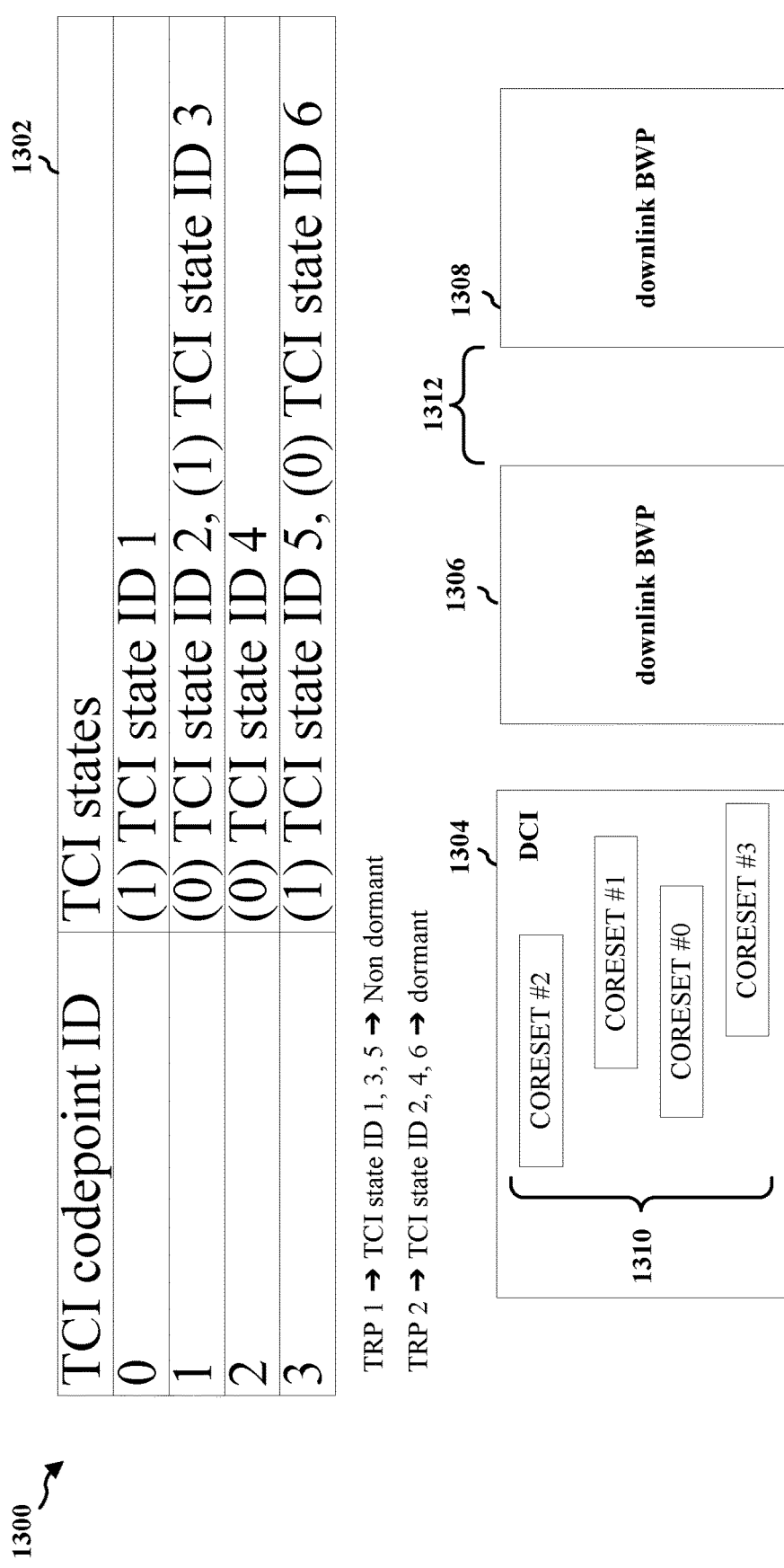
FIG. 13 shows a diagram of a plurality of DL BWPs scheduled by a DCI.

FIG. 13 shows a diagram 1300 of a DL BWP 1306 and a DL BWP 1308 scheduled by a DCI 1304. The DCI 1304 may be received by a UE, such as the UE 104 in FIG. 1, and may be transmitted by a network entity, such as the BS 102 in FIG. 1. The UE may have a set of TCI codepoints 1302, a set of CORESETs 1310 transmitted in a DCI 1304, a scheduled DL BWP 1306, and a scheduled DL BWP 1308. The scheduled DL BWP 1306 and DL BWP 1308 may be any suitable transmission scheduled for download by a UE, such as a PDSCH. The set of CORESETs 1310 may be encoded in the DCI 1304. Here, the DCI 1304 contains a set of CORESETs 1310 comprising CORESET #0, CORESET #1, CORESET #2, and CORESET #3. Between the DL BWP 1306 and the DL BWP 1308 may be an offset 1312 when a UE may opportunistically transmit an SRS. Where the UE sets a default TCI assumption to a TCI state ID, the UE may be configured to, by default, transmit and receive communication with the TRP associated with the TCI state ID.

A UE may be configured to use default TCI/QCL assumptions to transmit an SRS during the offset 1312 between the DL BWP 1306 and the DL BWP 1308 scheduled by the DCI 1304.

For example, if the UE determines that an SRS does not have an associated PL-RS or spatial relation information configured and for which a default beam for pathloss for the SRS is enabled in FR2 (e.g., enableDefaultBeamPL-ForSRS is configured for FR2), the UE may be configured to set the default TCI/QCL assumption for the default beam and PL RS to use the TCI state of the CORESET with the lowest ID in the active DL BWP 1306. In response to determining that the CORESET with the lowest ID in the active DL BWP 1306 has multiple TCI states (e.g., two states), the UE may be configured to select the first TCI state of the CORESET as the default beam and PL-RS. Here, that may be TCI state ID 1, since CORESET #0 has only one TCI state ID 4, and the next highest CORESET #1 has active TCI state ID 1 and active TCI state ID 3. TCI state ID 1 is the first TCI state of the two TCI states of CORESET #1.

In one aspect, if the UE receives a DCI indication of TRP dormancy, and the UE determines that an SRS does not have an associated PL-RS or spatial relation information configured and for which a default beam for pathloss for the SRS is enabled in FR2 (e.g., enableDefaultBeamPL-ForSRS is configured for FR2), the UE may be configured to set the default TCI/QCL assumption for the default beam and PL RS to use an active TCI state of a CORESET having a lowest ID in an active downlink BWP and having multiple TCI states. Here, that may be TCI state ID 1 since CORESET #0 has the lowest CORESET ID but only has one TCI state IL), and the next lowest CORESET #1 has two TCI states, and TCI state ID 1 is active while TCI state IL) 2 is not active.

In one aspect, if the UE receives a DCI indication of TRP dormancy, and the UE determines that an SRS does not have an associated PL-RS or spatial relation information configured and for which a default beam for pathloss for the SRS is enabled in FR2 (e.g., enableDefaultBeamPL-ForSRS is configured for FR2), the UE may be configured to set the default TCI/QCL assumption for the default beam and PL RS to use an active TCI state of the CORESET having the lowest ID in the active DL BWP 1306 and having one TCI state. Here, that may be TCI state ID 5 since CORESET #0 has the lowest CORESET ID but only has one dormant TCI state ID 4, CORESET #1 has two TCI states, and the next lowest CORESET #2 has one active TCI state ID 5.

In one aspect, if the UE receives a DCI indication of TRP dormancy, and the UE determines that an SRS does not have an associated PL-RS or spatial relation information configured and for which a default beam for pathloss for the SRS is enabled in FR2 (e.g., enableDefaultBeamPL-ForSRS is configured for FR2), the UE may be configured to set the default TCI/QCL assumption for the default beam and PL RS to use an active TCI state of the CORESET having the lowest ID with the active TCI state in the active downlink BWP.

In one aspect, if the UE receives a DCI indication of TRP dormancy, and the UE determines that an SRS does not have an associated PL-RS or spatial relation information configured and for which a default beam for pathloss for the SRS is enabled in FR2 (e.g., enableDefaultBeamPL-ForSRS is configured for FR2), the UE may be configured to set the default TCI/QCL assumption for the default beam and PL RS to use a combination of (1) an active TCI state of a CORESET having a lowest ID in the active DL BWP 1306 and having multiple TCI states, (2) an active TCI state of the CORESET having the lowest ID in the active DL BWP 1306 and one TCI state, or (3) an active TCI state of the CORESET having the lowest ID with the active TCI state in the active DL BWP 1306, in an order of priority. For example a UE may be configured to first use an active TCI state of the CORESET having the lowest ID in the active DL BWP 1306 and having one TCI state, but if no active TCI state may be found, then use an active TCI state of a CORESET having a lowest ID in an active DL BWP 1306 and having multiple TCI states. Here, that may be TCI state 1 if CORESET #2 was not contained in DCI 1304, since if CORESET #2 was not contained in DCI 1004 the set of CORESETs 1310 would not contain a coreset having one TCI state that has an active TCI, and the next lowest CORESET having multiple TCI states is CORESET #1, and TCI state ID 1 is active while TCI state ID 2 is not active.

Figure 14:
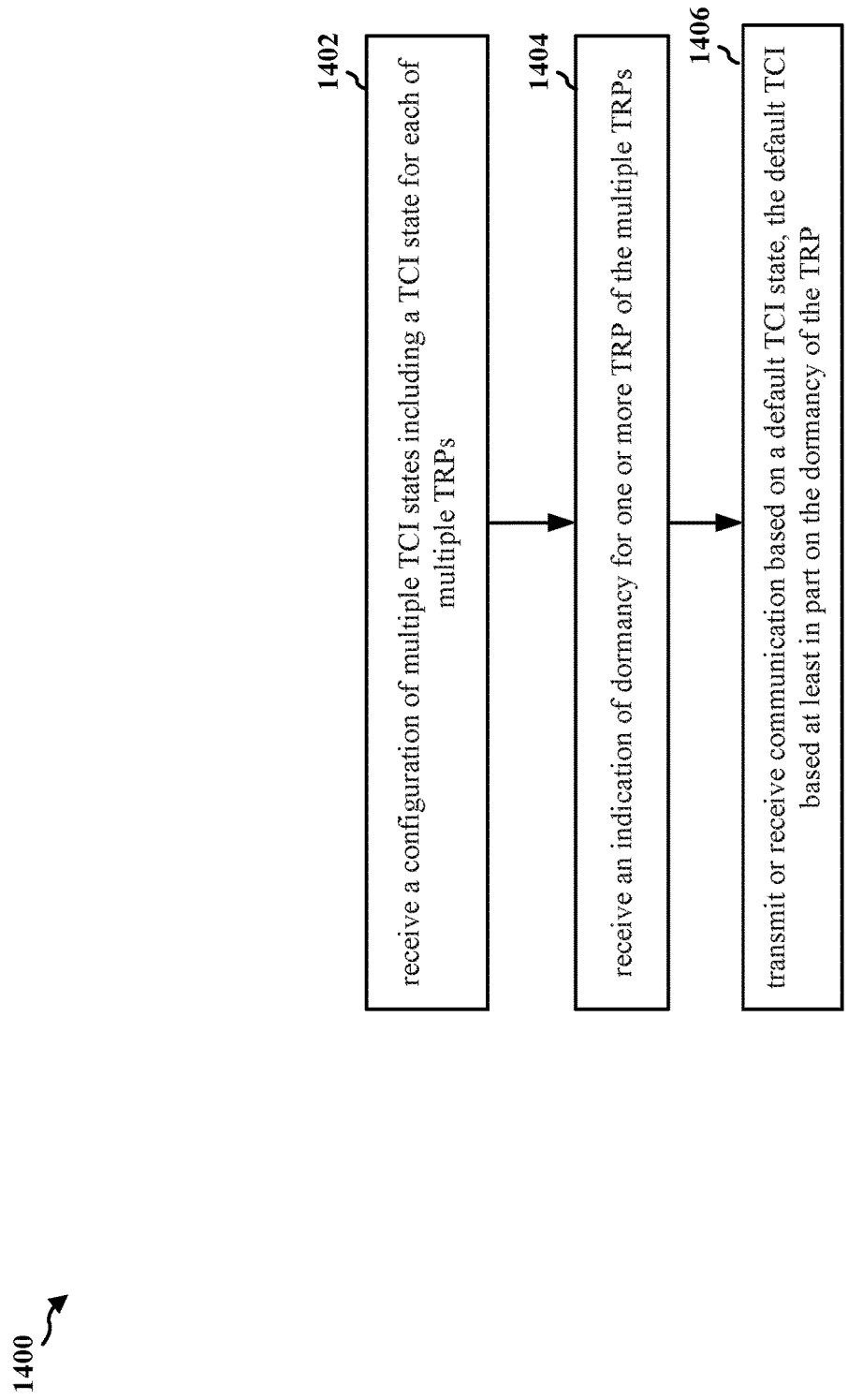
FIG. 14 is a flowchart of a method of wireless communication at a UE.

FIG. 14 is a flowchart 1400 of a method of wireless communication. The method may be performed by a UE (e.g., the UE 104; the UE 418; the UE 504; the apparatus 1604). At 1402, the UE may be configured to receive a configuration of multiple TCI states including a TCI state for each of multiple TRPs. For example, 1402 may be performed by the UE 504 in FIG. 5, which may be configured to receive a configuration of multiple TCI states 514 including a TCI state for each of multiple TRPs, such as the TCI states shown in the diagram 1000 in FIG. 10. Further, aspects of 1402 may be performed by the TRP dormancy communication component 198 in FIGS. 1 and 16.

At 1404, the UE may be configured to receive an indication of dormancy for one or more TRP of the multiple TRPs. For example, 1404 may be performed by the UE 504 in FIG. 5, which may be configured to receive an indication of dormancy 516 for one or more TRP of the TRP 502 and TRP 506. Further, aspects of 1404 may be performed by the TRP dormancy communication component 198 in FIGS. 1 and 16.

At 1406, the UE may be configured to transmit or receive communication based on a default TCI state, the default TCI based at least in part on the dormancy of the TRP. For example, 1406 may be performed by the UE 504 in FIG. 5, which may be configured to transmit or receive communication signals 518 based on a default TCI state, such as a TCI state determined by analyzing the data shown in FIG. 10. The default TCI may be based at least in part on the dormancy of the TRP, for example the UE 504 in FIG. 5 may not choose the TCI state ID 4 in FIG. 10 (associated with TRP 2) as that TCI state is dormant. Further, aspects of 1406 may be performed by the TRP dormancy communication component 198 in FIGS. 1 and 16.

Figure 15:
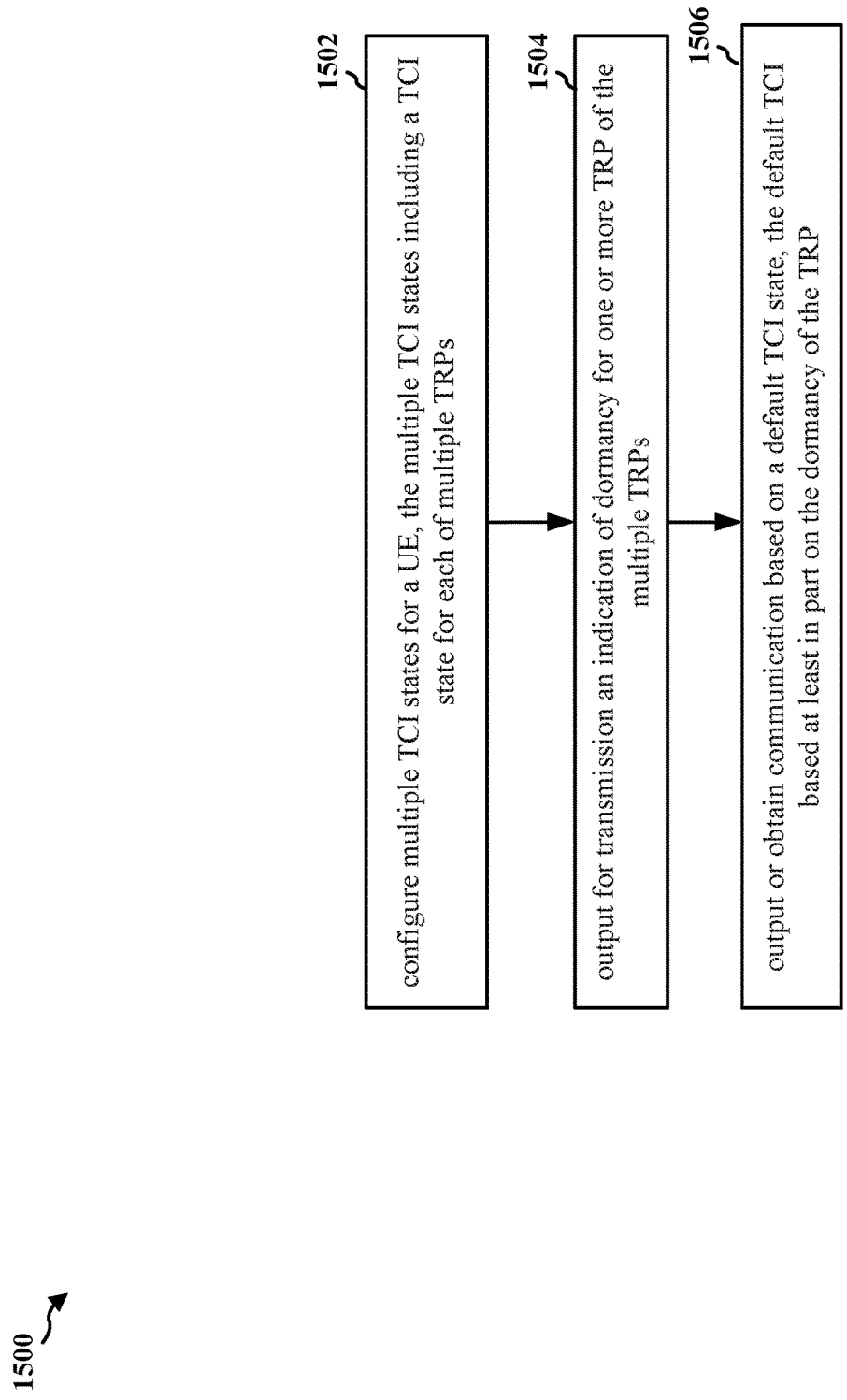
FIG. 15 is a flowchart of a method of wireless communication at a network entity.

FIG. 15 is a flowchart 1500 of a method of wireless communication. The method may be performed by a network entity (e.g., the BS 102; a network entity controlling the TRP P1 410, TRP P2 412, TRP S1 414, TRP S2 416, TRP 502, or TRP 506; the network entity 1602). At 1502, the UE may be configured to configure multiple TCI states, the multiple TCI states including a TCI state for each of multiple TRPs. For example, 1502 may be performed by a network entity controlling the TRP 506 in FIG. 5, which may be configured to configure multiple TCI states, such as the TCI states shown in diagram 1000 of FIG. 10. The multiple TCI states may include a TCI state for each of the TRP 502 and TRP 506. Further, aspects of 1502 may be performed by the TRP dormancy configuration component 199 in FIGS. 1 and 16.

At 1504, the UE may be configured to output for transmission an indication of dormancy for one or more TRP of the multiple TRPs. For example, 1504 may be performed by the TRP 506 in FIG. 5, which may be configured to output for transmission of an indication of dormancy 516 for one or more TRP of the TRP 502 and TRP 506. Further, aspects of 1504 may be performed by the TRP dormancy configuration component 199 in FIGS. 1 and 16.

At 1506, the UE may be configured to output or obtain communication based on a default TCI state, the default TCI based at least in part on the dormancy of the TRP. For example, 1506 may be performed by the TRP 506 in FIG. 5, which may be configured to output or obtain communication signals 518 based on a default TCI state. The default TCI may be based at least in part on the dormancy of the TRP, for example a TRP 2 associated with the TCI state ID 4 in FIG. 10 may not be used as the TRP is dormant. Further, aspects of 1506 may be performed by the TRP dormancy configuration component 199 in FIGS. 1 and 16.

Figure 16:
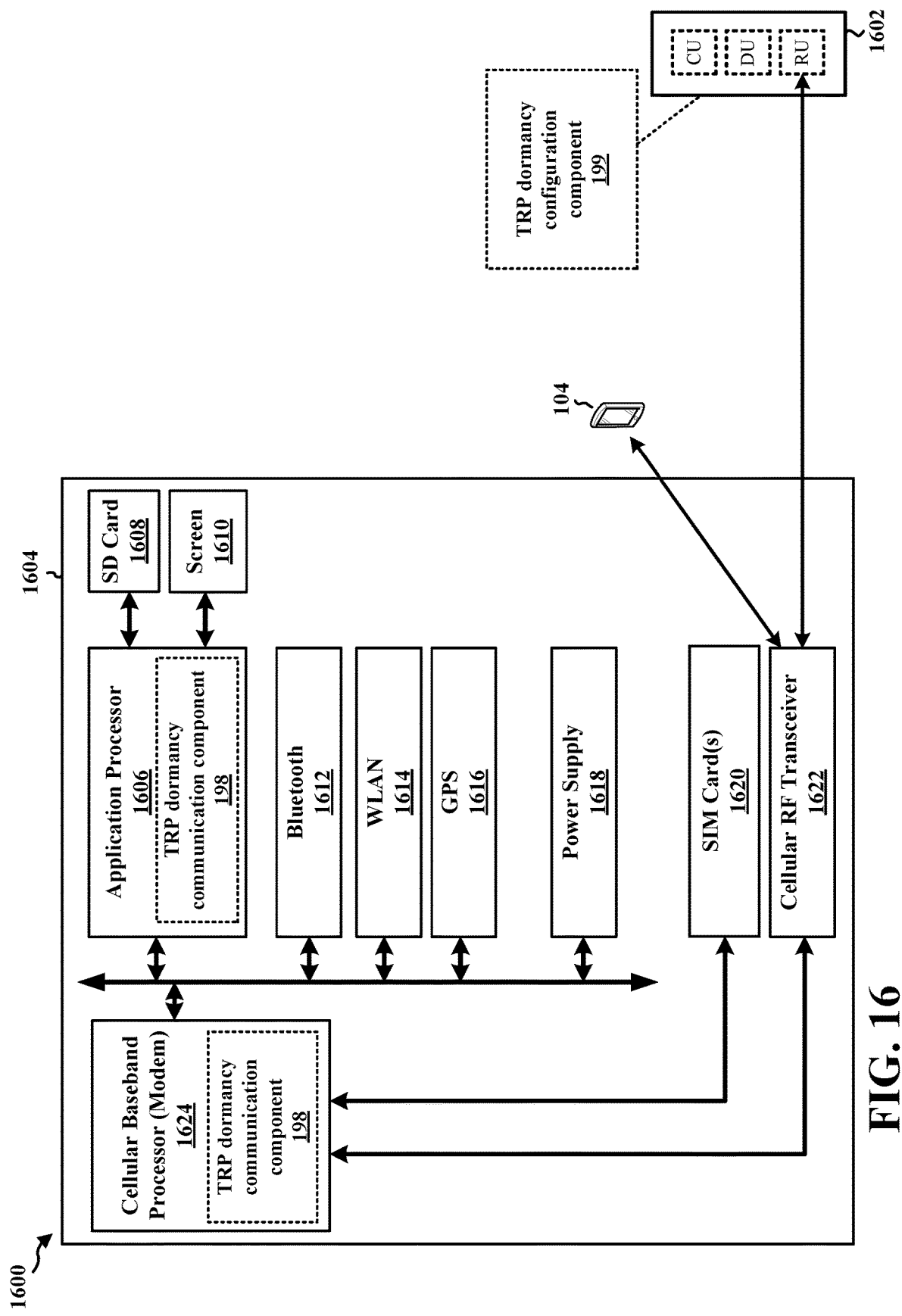
FIG. 16 is a diagram illustrating an example of a hardware implementation for an example apparatus.

FIG. 16 is a diagram 1600 illustrating an example of a hardware implementation for an apparatus 1604 and a network entity 1602. The apparatus 1604 may be a UE, a component of a UE, or may implement UE functionality. The network entity 1602 may be a BS, a component of a BS, or may implement BS functionality. The network entity 1602 may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. In some aspects, the apparatus 1604 may include a cellular baseband processor 1624 (also referred to as a modem) coupled to a cellular RF transceiver 1622. In some aspects, the apparatus 1604 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1624 communicates through the cellular RF transceiver 1622 with the UE 104 and/or with an RU associated with the network entity 1602. The RU is either part of the network entity 1602 or is in communication with the network entity 1602. The network entity 1602 may include one or more of the CU, DU, and the RU. The cellular baseband processor 1624 and the application processor 1606 may each include a computer-readable medium/memory. Each computer-readable medium/memory may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the Tx processor 368, the Rx processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 350 in FIG. 3) and include the additional modules of the apparatus 1604.

As discussed supra, the component 198 may be configured to receive a configuration of multiple TCI states including a TCI state for each of multiple TRPs. The component 198 may also receive an indication of dormancy for one or more TRP of the multiple TRPs. The component 198 may further transmit or receive communication based on a default TCI state, the default TCI based at least in part on the dormancy of the TRY. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receive a configuration of multiple TCI states including a TCI state for each of multiple TRPs, means for outputting for transmission an indication of dormancy for one or more TRP of the multiple TRPs, and means for outputting or obtain communication based on a default TCI state, the default TCI based at least in part on the dormancy of the TRP. The means may be the component 198 of the apparatus 1604 configured to perform the functions recited by the means. As described supra, the apparatus 1604 may include the Tx processor 368, the Rx processor 356, and the controller/processor 359. As such, in one configuration, the means may be the Tx processor 368, the Rx processor 356, and/or the controller/processor 359 configured to perform the functions recited by the means.

As discussed supra, the component 199 may be configured to configure multiple TCI states for a UE. The multiple TCI states may include a TCI state for each of multiple TRPs. The component 199 may output for transmission an indication of dormancy for one or more TRP of the multiple TRPs. The component 199 may further output or obtain communication based on a default TCI state, the default TCI based at least in part on the dormancy of the TRP. The component 199 may be within one or more processors (e.g., BBU(s)) of one or more of the CU, DU, and the RU. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for configuring multiple TCI states for a UE, the multiple TCI states including a TCI state for each of multiple TRPs, means for outputting for transmission an indication of dormancy for one or more TRP of the multiple TRPs, and means for outputting or obtaining communication based on a default TCI state, the default TCI based at least in part on the dormancy of the TRP. The means may be the component 199 of the network entity 1602 configured to perform the functions recited by the means. As described supra, the network entity 1602 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including receiving a configuration of multiple TCI states including a TCI state for each of multiple TRPs. The method may further include receiving an indication of dormancy for one or more TRP of the multiple TRPs. The method may further include transmitting or receiving communication based on a default TCI state, the default TCI state based at least in part on the dormancy of the one or more TRP of the multiple TRPs.

Aspect 2 is the method of aspect 1, where transmitting or receiving the communication may include receiving a PDSCH with a scheduling offset between the PDSCH and reception of DCI scheduling the PDSCH that is less than a threshold and having an RRC configured transmission scheme with the default TCI state that is based on at least one of (1) an active TCI state of a lowest TCI codepoint having multiple TCI states, (2) the active TCI state of a lowest TCI codepoint having one TCI state, (3) the active TCI state of a CORESET having a lowest ID in a previous slot and having multiple TCI states, or (4) the active TCI state of the CORESET having the lowest ID in the previous slot and having one TCI state.

Aspect 3 is the method of any of aspects 1 and 2, where the method further includes receiving control information scheduling a PDSCH without a TCI field in DCI payload. Transmitting or receiving the communication may further include receiving the PDSCH with the default TCI state that is based on at least one of (1) an active TCI state of a CORESET having a lowest ID in a previous slot and having multiple TCI states, or (2) the active TCI state of the CORESET having the lowest ID in the previous slot and having one TCI state.

Aspect 4 is the method of any of aspects 1 to 3, where transmitting or receiving the communication may further include receiving a CSI-RS. The CSI-RS may have a scheduling offset between the CSI-RS and a triggering DCI that is less than a threshold and overlapping with a PDSCH, a CORESET, or an additional CSI-RS having multiple TCI states. The default TCI state may be based on an active TCI state of the PDSCH, the CORESET, or the additional CSI-RS.

Aspect 5 is the method of any of aspects 1 to 4, where transmitting or receiving the communication may further include receiving a CSI-RS. The CSI-RS may have a scheduling offset between the CSI-RS and a triggering DCI that is less than a threshold. A CSI may not overlap with a downlink signal or downlink channel. The default TCI state may be based on at least one of (1) an active TCI state of a CORESET having a lowest ID in a previous slot and having multiple TCI states, or the active TCI state of the CORESET having the lowest ID in the previous slot.

Aspect 6 is the method of any of aspects 1 to 5, where transmitting or receiving the communication may further include transmitting a PUCCH. The PUCCH may not have a configured pathloss reference signal or spatial relation information. The PUCCH may use the default TCI state or a quasi co-location relationship that is based on at least one of (1) an active TCI state of a CORESET having a lowest ID in an active downlink BWP and having multiple TCI states, (2) the active TCI state of the CORESET having the lowest ID in the active downlink BWP and having one TCI state, or (3) the active TCI state of the CORESET having the lowest ID with the active TCI state in the active downlink BWP.

Aspect 7 is the method of any of aspects 1 to 6, where transmitting or receiving the communication may further include transmitting a PUSCH, which is scheduled by a DCI format 0_0 and for which a default beam for pathloss is enabled FR2 without a PUCCH resource on an active uplink BWP cell or without having a spatial relation configured in any PUCCH resource on the active uplink BWP cell. The PUSCH may use the default TCI state or a quasi co-location relationship that is based on at least one of (1) an active TCI state of a CORESET having a lowest ID in an active downlink BWP and having multiple TCI states, (2) the active TCI state of the CORESET having the lowest ID in the active downlink BWP and having one TCI state, or (3) the active TCI state of the CORESET having the lowest ID with the active TCI state in the active downlink BWP.

Aspect 8 is the method of any of aspects 1 to 7, where transmitting or receiving the communication may further include transmitting an SRS, which does not have an associated pathloss reference signal or spatial relation information configured and for which a default beam for pathloss for the SRS is enabled in FR2. The SRS may use the default TCI state or a quasi co-location relationship that is based on at least one of (1) an active TCI state of a CORESET having a lowest ID in an active downlink BWP and having multiple TCI states, (2) the active TCI state of the CORESET having the lowest ID in the active downlink IMP and having one TCI state, or (3) the active TCI state of the CORESET having the lowest ID with the active TCI state in the active downlink BWP.

Aspect 9 is a method of wireless communication at a network entity, including configuring multiple TCI states. The multiple TCI states may include a TCI state for each of multiple TRPs. The method may further include outputting for transmission an indication of dormancy for one or more TRP of the multiple TRPs. The method may further include outputting or obtaining communication based on a default TCI state, the default TCI state based at least in part on the dormancy of the one or more TRP of the multiple TRPs.

Aspect 10 is the method of aspect 9, where outputting or obtaining the communication may further include outputting a PDSCH with a scheduling offset between the PDSCH and reception of DCI scheduling the PDSCH that is less than a threshold and having an RRC configured transmission scheme with the default TCI state that is based on at least one of (1) an active TCI state of a lowest TCI codepoint having multiple TCI states, (2) the active TCI state of a lowest TCI codepoint having one TCI state, (3) the active TCI state of a CORESET having a lowest ID in a previous slot and having multiple TCI states, or (4) the active TCI state of the CORESET having the lowest ID in the previous slot and having one TCI state.

Aspect 11 is the method of any of aspects 9 to 10, where outputting or obtaining the communication may further include outputting the PDSCH with the default TCI state that is based on at least one of (1) an active TCI state of a CORESET having a lowest ID in a previous slot and having multiple TCI states, or (2) the active TCI state of the CORESET having the lowest ID in the previous slot and having one TCI state.

Aspect 12 is the method of any of aspects 9 to 11, where outputting or obtaining the communication may further include outputting a CSI-RS. The CSI-RS may have a scheduling offset between the CSI-RS and a triggering DCI that is less than a threshold and overlapping with a PDSCH, a CORESET, or an additional CSI-RS having multiple TCI states. The default TCI state may be based on an active TCI state of the PDSCH, the CORESET, or the additional CSI-RS.

Aspect 13 is the method of any of aspects 9 to 12, where outputting or obtaining the communication may further include outputting a CSI-RS. The CSI-RS may have a scheduling offset between the CSI-RS and a triggering DCI that is less than a threshold and a CSI not overlapping with a downlink signal or downlink channel. The default TCI state may be based on at least one of (1) an active TCI state of a CORESET having a lowest ID in a previous slot and having multiple TCI states, or (2) the active TCI state of the CORESET having the lowest ID in the previous slot.

Aspect 14 is the method of any of aspects 9 to 13, where outputting or obtaining the communication may further include obtaining a PUCCH which does not have a configured pathloss reference signal or spatial relation information. The PUCCH may use the default TCI state or a quasi co-location relationship that is based on at least one of (1) an active TCI state of a CORESET having a lowest ID in an active downlink BWP and having multiple TCI states, (2) the active TCI state of the CORESET having the lowest ID in the active downlink BWP and having one TCI state, or (3) the active TCI state of the CORESET having the lowest ID with the active TO state in the active downlink BWP.

Aspect 15 is the method of any of aspects 9 to 14, where outputting or obtaining the communication may further include obtaining a PUSCH. The PUSCH may be scheduled by a DCI format 0_0 and for which a default beam for pathloss may be enabled in FR2 without a PUCCH resource on an active uplink BWP cell or without having a spatial relation configured in any PUCCH resource on the active uplink BWP cell. The PUSCH may use the default TCI state or a quasi co-location relationship that is based on at least one of (1) an active TCI state of a CORESET having a lowest ID in an active downlink BWP and having multiple TO states, (2) the active TCI state of the CORESET having the lowest ID in the active downlink BWP and having one TCI state, or (3) the active TCI state of the CORESET having the lowest ID with the active TCI state in the active downlink BWP.

Aspect 16 is the method of any of aspects 9 to 15, where outputting or obtaining the communication may further include obtaining an SRS, which does not have an associated pathloss reference signal or spatial relation information configured and for which a default beam for pathloss for the SRS is enabled in FR2, The SRS may use the default TCI state or a quasi co-location relationship that is based on at least one of (1) an active TCI state of a CORESET having a lowest ID in an active downlink BWP and having multiple TCI states, (2) the active TCI state of the CORESET having the lowest ID in the active downlink BWP and having one TCI state, or (3) the active TCI state of the CORESET having the lowest ID with the active TCI state in the active downlink BWP.

Aspect 17 is an apparatus for wireless communication at a UE including at least one processor coupled to a memory and configured to implement any of aspects 1 to 8.

Aspect 18 is an apparatus for wireless communication at a network entity including at least one processor coupled to a memory and configured to implement any of aspects 9 to 16.

Aspect 19 is an apparatus for wireless communication including means for implementing any of aspects 1 to 16.

Aspect 20 is a computer-readable medium storing computer executable code, where the code when executed by a processor causes the processor to implement any of aspects 1 to 16.

What is claimed is:

1. An apparatus for wireless communication at a user equipment (UE), comprising:
   at least one memory; and
   at least one processor coupled to the at least one memory and configured to:
      receive a first message comprising a configuration of multiple transmission configuration indication (TCI) states including a TCI state for each of multiple transmission reception points (TRPs);
      receive a second message, after a reception of the first message, comprising an indication of dormancy for one or more TRP of the multiple TRPs; and
      transmit or receive communication based on a default TCI state, the default TCI state based at least in part on the dormancy of the one or more TRP of the multiple TRPs.

2. The apparatus of claim 1, wherein the second message comprises a radio resource control (RRC) message, wherein, to transmit or receive the communication, the at least one processor is configured to:
   receive a physical downlink shared channel (PDSCH) with a scheduling offset between the PDSCH and reception of downlink control information (DCI) scheduling the PDSCH that is less than a threshold and having a transmission scheme configured by the RRC message with the default TCI state that is based on at least one of:
  an active TCI state of a lowest TCI codepoint having multiple TCI states,
  the active TCI state of a lowest TCI codepoint having one TCI state,
  the active TCI state of a control resource set (CORESET) having a lowest identifier (II)) in a previous slot and having multiple TCI states, or
  the active TCI state of the CORESET having the lowest ID in the previous slot and having one TCI state.

3. The apparatus of claim 1, wherein the first message comprises a radio resource control (RRC) message, wherein the second message comprises downlink control information (DCI), wherein the at least one processor is further configured to:
  receive control information scheduling a physical downlink shared channel (PDSCH) without a TCI field in a payload of the DCI, wherein, to transmit or receive the communication, the at least one processor is configured to:
  receive the PDSCH with the default TCI state that is based on at least one of:
    an active TCI state of a CORESET having a lowest ID in a previous slot and having multiple TCI states, or
    the active TCI state of the CORESET having the lowest ID in the previous slot and having one TCI state.

4. The apparatus of claim 1, wherein the second message comprises downlink control information (DCI), further comprising a transceiver coupled to the at least one processor, wherein, to transmit or receive the communication, the at least one processor is configured to:
  receive a channel state information reference signal (CSI-RS), the CSI-RS having a scheduling offset between the CSI-RS and the DCI that is less than a threshold and overlapping with a PDSCH, a CORESET, or an additional CSI-RS having multiple TCI states, with the default TCI state that is based on an active TCI state of the PDSCH, the CORESET, or the additional CSI-RS.

5. The apparatus of claim 1, wherein the second message comprises downlink control information (DCI), wherein, to transmit or receive the communication, the at least one processor is further configured to:
  receive a CSI-RS, the CSI-RS having a scheduling offset between the CSI-RS and the DCI that is less than a threshold and a CSI not overlapping with a downlink signal or downlink channel, with the default TCI state that is based on at least one of:
    an active TCI state of a CORESET having a lowest ID in a previous slot and having multiple TCI states, or
    the active TCI state of the CORESET having the lowest ID in the previous slot.

6. The apparatus of claim 1, wherein, to transmit or receive the communication, the at least one processor is configured to:
  transmit a physical uplink control channel (PUCCH), which does not have a configured pathloss reference signal or spatial relation information, the PUCCH using the default TCI state or a quasi co-location relationship that is based on at least one of:
    an active TCI state of a CORESET having a lowest ID in an active downlink bandwidth part (BWP) and having multiple TCI states,
    the active TCI state of the CORESET having the lowest ID in the active downlink BWP and having one TCI state, or
    the active TCI state of the CORESET having the lowest ID with the active TCI state in the active downlink BWP.

7. The apparatus of claim 1, wherein the second message comprises downlink control information (DCD), wherein, to transmit or receive the communication, the at least one processor is further configured to:
  transmit a physical uplink shared channel (PUSCH), which is scheduled by a DCI format 0_0 of the DCI and for which a default beam for pathloss is enabled in frequency range 2 (FR2) without a physical uplink control channel (PUCCH) resource on an active uplink bandwidth part (BWP) cell or without having a spatial relation configured in any PUCCH resource on the active uplink BWP cell, the PUSCH using the default TCI state or a quasi co-location relationship that is based on at least one of:
    an active TCI state of a CORESET having a lowest ID in an active downlink BWP and having multiple TCI states,
    the active TCI state of the CORESET having the lowest ID in the active downlink BWP and having one TCI state, or
    the active TCI state of the CORESET having the lowest ID with the active TCI state in the active downlink BWP.

8. The apparatus of claim 1, wherein, to transmit or receive the communication, the at least one processor is configured to:
  transmit a sounding reference signal (SRS), which does not have an associated pathloss reference signal or spatial relation information configured and for which a default beam for pathloss for the SRS is enabled in FR2, the SRS using the default TCI state or a quasi co-location relationship that is based on at least one of:
    an active TCI state of a CORESET having a lowest ID in an active downlink BWP and having multiple TCI states,
    the active TCI state of the CORESET having the lowest ID in the active downlink BWP and having one TCI state, or
    the active TCI state of the CORESET having the lowest ID with the active TCI state in the active downlink BWP.

9. An apparatus for wireless communication at a network entity, comprising:
  at least one memory; and
  at least one processor coupled to the at least one memory and configured to:
    configure multiple transmission configuration indication (TCI) states, the multiple TCI states including a TCI state for each of multiple transmission reception points (TRPs);
    output for transmission a first message comprising the configured multiple TCI states;
    output for transmission, after the transmission of the first message, a second message comprising an indication of dormancy for one or more TRP of the multiple TRPs; and
    output or obtain communication based on a default TCI state, the default TCI state based at least in part on the dormancy of the one or more TRP of the multiple TRPs.

10. The apparatus of claim 9, wherein the second message comprises downlink control information (DCI), wherein, to output or obtain the communication, the at least one processor is configured to:

outputting a physical downlink shared channel (PDSCH) with a scheduling offset between the PDSCH and reception of the DCI scheduling the PDSCH that is less than a threshold and having a radio resource control (RRC) configured transmission scheme with the default TCI state that is based on at least one of:
- an active TCI state of a lowest TCI codepoint having multiple TCI states,
- the active TCI state of a lowest TCI codepoint having one TCI state,
- the active TCI state of a control resource set (CORESET) having a lowest identifier (ID) in a previous slot and having multiple TCI states, or
- the active TCI state of the CORESET having the lowest ID in the previous slot and having one TCI state.

11. The apparatus of claim 9, wherein the second message comprises downlink control information (DCI), wherein the at least one processor is further configured to:
output control information scheduling a PDSCH without a TCI field in a payload of the DCI, wherein, to output or obtain the communication, the at least one processor is configured to:
output the PDSCH with the default TCI state that is based on at least one of:
- an active TCI state of a CORESET having a lowest ID in a previous slot and having multiple TCI states, or
- the active TCI state of the CORESET having the lowest ID in the previous slot and having one TCI state.

12. The apparatus of claim 9, wherein the second message comprises downlink control information (DCI), further comprising a transceiver coupled to the at least one processor, wherein, to output or obtain the communication, the at least one processor is configured to:
output a channel state information reference signal (CSI-RS), the CSI-RS having a scheduling offset between the CSI-RS and the DCI that is less than a threshold and overlapping with a PDSCH, a control resource set (CORESET), or an additional CSI-RS having multiple TCI states, with the default TCI state that is based on an active TCI state of the PDSCH, the CORESET, or the additional CSI-RS.

13. The apparatus of claim 9, wherein the second message comprises downlink control information (DCI), wherein, to output or obtain the communication, the at least one processor is configured to:
output a CSI-RS, the CSI-RS having a scheduling offset between the CSI-RS and the DCI that is less than a threshold and a CSI not overlapping with a downlink signal or downlink channel, with the default TCI state that is based on at least one of:
- an active TCI state of a CORESET having a lowest ID in a previous slot and having multiple TCI states, or
- the active TCI state of the CORESET having the lowest ID in the previous slot.

14. The apparatus of claim 9, wherein, to output or obtain the communication, the at least one processor is configured to:
obtain a physical uplink control channel (PUCCH), which does not have a configured pathloss reference signal or spatial relation information, the PUCCH using the default TCI state or a quasi co-location relationship that is based on at least one of:
- an active TCI state of a CORESET having a lowest ID in an active downlink bandwidth part (BWP) and having multiple TCI states,
- the active TCI state of the CORESET having the lowest ID in the active downlink BWP and having one TCI state, or
- the active TCI state of the CORESET having the lowest ID with the active TCI state in the active downlink BWP.

15. The apparatus of claim 9, wherein the second message comprises downlink control information (DCI), wherein, to output or obtain the communication, the at least one processor is configured to:
obtaining a physical uplink shared channel (PUSCH), which is scheduled by a DCI format 0_0 of the DCI and for which a default beam for pathloss is enabled in frequency range 2 (FR2) without a PUCCH resource on an active uplink BWP cell or without having a spatial relation configured in any PUCCH resource on the active uplink BWP cell, the PUSCH using the default TCI state or a quasi co-location relationship that is based on at least one of:
- an active TCI state of a CORESET having a lowest ID in an active downlink BWP and having multiple TCI states,
- the active TCI state of the CORESET having the lowest ID in the active downlink BWP and having one TCI state, or
- the active TCI state of the CORESET having the lowest ID with the active TCI state in the active downlink BWP.

16. The apparatus of claim 9, wherein, to output or obtain the communication, the at least one processor is configured to:
obtaining a sounding reference signal (SRS), which does not have an associated pathloss reference signal or spatial relation information configured and for which a default beam for pathloss for the SRS is enabled in frequency range 2 (FR2), the SRS using the default TCI state or a quasi co-location relationship that is based on at least one of:
- an active TCI state of a CORESET having a lowest ID in an active downlink BWP and having multiple TCI states,
- the active TCI state of the CORESET having the lowest ID in the active downlink BWP and having one TCI state, or
- the active TCI state of the CORESET having the lowest ID with the active TCI state in the active downlink BWP.

17. A method of wireless communication at a user equipment (UE), comprising:
receiving a first message comprising a configuration of multiple transmission configuration indication (TCI) states including a TCI state for each of multiple transmission reception points (TRPs);
receiving a second message, after a reception of the first message, comprising an indication of dormancy for one or more TRP of the multiple TRPs; and
transmitting or receiving communication based on a default TCI state, the default TCI based at least in part on the indication of dormancy for the one or more TRP of the multiple TRPs.

18. The method of claim 17, wherein the second message comprises a radio resource control (RRC) message, wherein transmitting or receiving the communication includes:
receiving a physical downlink shared channel (PDSCH) with a scheduling offset between the PDSCH and reception of downlink control information (DCI) scheduling the PDSCH that is less than a threshold and having a transmission scheme configured by the RRC message with the default TCI state that is based on at least one of:
- an active TCI state of a lowest TCI codepoint having multiple TCI states,
- the active TCI state of a lowest TCI codepoint having one TCI state,
- the active TCI state of a control resource set (CORESET) having a lowest identifier (ID) in a previous slot and having multiple TCI states, or
- the active TCI state of the CORESET having the lowest ID in the previous slot and having one TCI state.

19. The method of claim 17, wherein the first message comprises a radio resource control (RRC) message, wherein the second message comprises downlink control information (DCI), further comprising:
receiving control information scheduling a physical downlink shared channel (PDSCH) without a TCI field in a payload of the DCI, wherein transmitting or receiving the communication includes:
receiving the PDSCH with the default TCI state that is based on at least one of:
- an active TCI state of a CORESET having a lowest ID in a previous slot and having multiple TCI states, or
- the active TCI state of the CORESET having the lowest ID in the previous slot and having one TCI state.

20. The method of claim 17, wherein the second message comprises downlink control information (DCI), wherein transmitting or receiving the communication includes:
receiving a channel state information reference signal (CSI-RS), the CSI-RS having a scheduling offset between the CSI-RS and the DCI that is less than a threshold and overlapping with a PDSCH, a CORESET, or an additional CSI-RS having multiple TCI states, with the default TCI state that is based on an active TCI state of the PDSCH, the CORESET, or the additional CSI-RS.

21. The method of claim 17, wherein the second message comprises downlink control information (DCI), wherein transmitting or receiving the communication includes:
receiving a CSI-RS, the CSI-RS having a scheduling offset between the CSI-RS and the DCI that is less than a threshold and a CSI not overlapping with a downlink signal or downlink channel, with the default TCI state that is based on at least one of:
- an active TCI state of a CORESET having a lowest ID in a previous slot and having multiple TCI states, or
- the active TCI state of the CORESET having the lowest ID in the previous slot.

22. The method of claim 17, wherein transmitting or receiving the communication includes:
transmitting a physical uplink control channel (PUCCH), which does not have a configured pathloss reference signal or spatial relation information, the PUCCH using the default TCI state or a quasi co-location relationship that is based on at least one of:
- an active TCI state of a CORESET having a lowest ID in an active downlink bandwidth part (BWP) and having multiple TCI states,
- the active TCI state of the CORESET having the lowest ID in the active downlink BWP and having one TCI state, or
- the active TCI state of the CORESET having the lowest ID with the active TCI state in the active downlink BWP.

23. The method of claim 17, wherein the second message comprises downlink control information (DCI), wherein transmitting or receiving the communication includes:
transmitting a physical uplink shared channel (PUSCH), which is scheduled by a DCI format 0_0 of the DCI and for which a default beam for pathloss is enabled in frequency range 2 (FR2) without a PUCCH resource on an active uplink BWP cell or without having a spatial relation configured in any physical uplink control channel (PUCCH) resource on an active uplink bandwidth part (BWP) [BWP] cell, the PUSCH using the default TCI state or a quasi co-location relationship that is based on at least one of:
- an active TCI state of a CORESET having a lowest ID in an active downlink BWP and having multiple TCI states,
- the active TCI state of the CORESET having the lowest ID in the active downlink BWP and having one TCI state, or
- the active TCI state of the CORESET having the lowest ID with the active TCI state in the active downlink BWP.

24. A method of wireless communication at a network entity, comprising:
configuring multiple transmission configuration indication (TCI) states, the multiple TCI states including a TCI state for each of multiple transmission reception points (TRPs);
outputting for transmission a first message comprising the configured multiple TCI states;
outputting for transmission, after the transmission of the first message, a second message comprising an indication of dormancy for one or more TRP of the multiple TRPs; and
outputting or obtaining communication based on a default TCI state, the default TCI state based at least in part on the dormancy of the one or more TRP of the multiple TRPs.

25. The method of claim 24, wherein the second message comprises downlink control information (DCI), wherein outputting or obtaining the communication includes:
outputting a physical downlink shared channel (PDSCH) with a scheduling offset between the PDSCH and reception of the DCI scheduling the PDSCH that is less than a threshold and having a radio resource control (RRC) configured transmission scheme with the default TCI state that is based on at least one of:
- an active TCI state of a lowest TCI codepoint having multiple TCI states,
- the active TCI state of a lowest TCI codepoint having one TCI state,
- the active TCI state of a control resource set (CORESET) having a lowest identifier (ID) in a previous slot and having multiple TCI states, or
- the active TCI state of the CORESET having the lowest ID in the previous slot and having one TCI state.

26. The method of claim 24, wherein the second message comprises downlink control information (DCD), further comprising:
outputting control information scheduling a PDSCH without a TCI field in a [DCI] payload of the DCI, wherein outputting or obtaining the communication includes:
outputting the PDSCH with the default TCI state that is based on at least one of:
- an active TCI state of a CORESET having a lowest ID in a previous slot and having multiple TCI states, or the active TCI state of the CORESET having the lowest ID in the previous slot and having one TCI state.

27. The method of claim 24, wherein the second message comprises downlink control information (DCI), wherein outputting or obtaining the communication includes:
outputting a channel state information reference signal (CSI-RS), the CSI-RS having a scheduling offset between the CSI-RS and the DCI that is less than a threshold and overlapping with a PDSCH, a control resource set (CORESET), or an additional CSI-RS having multiple TCI states, with the default TCI state that is based on an active TCI state of the PDSCH, the CORESET, or the additional CSI-RS.

28. The method of claim 24, wherein the second message comprises downlink control information (DCI), wherein outputting or obtaining the communication includes:
outputting a CSI-RS, the CSI-RS having a scheduling offset between the CSI-RS and the DCI that is less than a threshold and a CSI not overlapping with a downlink signal or downlink channel, with the default TCI state that is based on at least one of:
an active TCI state of a CORESET having a lowest ID in a previous slot and having multiple TCI states, or
the active TCI state of the CORESET having the lowest ID in the previous slot.

29. The method of claim 24, wherein outputting or obtaining the communication includes:
obtaining a physical uplink control channel (PUCCH) which does not have a configured pathloss reference signal or spatial relation information, the PUCCH using the default TCI state or a quasi co-location relationship that is based on at least one of:
an active TCI state of a CORESET having a lowest ID in an active downlink bandwidth part (BWP) and having multiple TCI states,
the active TCI state of the CORESET having the lowest ID in the active downlink BWP and having one TCI state, or
the active TCI state of the CORESET having the lowest ID with the active TCI state in the active downlink BWP.

30. The method of claim 24, wherein the second message comprises downlink control information (DCI), wherein outputting or obtaining the communication includes:
obtaining a physical uplink shared channel (PUSCH), which is scheduled by a DCI format 0_0 of the DCI and for which a default beam for pathloss is enabled in frequency range 2 (FR2) without a PUCCH resource on an active uplink BWP cell or without having a spatial relation configured in any PUCCH resource on the active uplink BWP cell, the PUSCH using the default TCI state or a quasi co-location relationship that is based on at least one of:
an active TCI state of a CORESET having a lowest ID in an active downlink BWP and having multiple TCI states,
the active TCI state of the CORESET having the lowest ID in the active downlink BWP and having one TCI state, or
the active TCI state of the CORESET having the lowest ID with the active TCI state in the active downlink BWP.

\* \* \* \* \*